(12) United States Patent
King et al.

(10) Patent No.: US 9,562,927 B2
(45) Date of Patent: Feb. 7, 2017

(54) FORCE DETECTION FOR MICROSCOPY BASED ON DIRECT TIP TRAJECTORY OBSERVATION

(71) Applicant: The Curators of the University of Missouri, Columbia, MO (US)

(72) Inventors: Gavin McLean King, Columbia, MO (US); Krishna Prasad Sigdel, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 14/872,332

(22) Filed: Oct. 1, 2015

(65) Prior Publication Data
US 2016/0124014 A1    May 5, 2016

Related U.S. Application Data

(60) Provisional application No. 62/060,274, filed on Oct. 6, 2014.

(51) Int. Cl.
| | |
|---|---|
| *G01Q 20/02* | (2010.01) |
| *G01Q 20/00* | (2010.01) |
| *G01Q 60/24* | (2010.01) |
| *G01Q 30/04* | (2010.01) |
| *G01Q 60/34* | (2010.01) |

(52) U.S. Cl.
CPC .............. *G01Q 20/02* (2013.01); *G01Q 20/00* (2013.01); *G01Q 30/04* (2013.01); *G01Q 60/24* (2013.01); *G01Q 60/34* (2013.01)

(58) Field of Classification Search
None
See application file for complete search history.

(56) References Cited

U.S. PATENT DOCUMENTS

| 8,387,158 B2 | 2/2013 | Perkins et al. |
| 2010/0257641 A1 | 10/2010 | Perkins et al. |

FOREIGN PATENT DOCUMENTS

| WO | 00/46569 A1 | 8/2000 |

OTHER PUBLICATIONS

Churnside et al., "Independent Measurements of Force and Position in Atomic Force Microscopy", Proceedings of SPIE, Aug. 20, 2009, pp. 74050H1-74050H7, vol. 7405.
Churnside et al., "Ultrastable Atomic Force Microscopy: Improved Force and Positional Stability", FEBS Letters, May 4, 2014, pp. 3621-3630, vol. 588, No. 19.
King et al., "Ultrastable Atomic Force Microscopy: Atomic-Scale Stability and Registration in Ambient Conditions", Nano Letters, Apr. 8, 2009, pp. 1451-1456, vol. 9, No. 4.
Sigdel et al., "Supporting Information: Three-Dimensional Atomic Force Microscopy: Interaction Force Vector by Direct Observation of Tip Trajectory", Oct. 7, 2013, retrieved from the internet: URL: http://pubs.acs.org/doi/suppl/10.1021/n14034123p/suppl_file/n1403423p_si_001.pdf on Dec. 9, 2015.
(Continued)

*Primary Examiner* — Jack Berman
(74) *Attorney, Agent, or Firm* — Thompson Coburn LLP

(57) ABSTRACT

With example embodiments described herein, a probe tip of a scanning probe microscope (such as an atomic force microscope (AFM)) is directly detected as it moves in a tapping mode to determine the tip positions over time, and a force for the tip is computed from these determined tip positions.

37 Claims, 15 Drawing Sheets

(56) References Cited

OTHER PUBLICATIONS

Sigdel et al., "Three-Dimensional Atomic Force Microscopy: Interaction Force Vector by Direct Observation of Tip Trajectory", Biophysical Journal, Jan. 28, 2014, vol. 106, No. 2.
Sigdel et al., "Three-Dimensional Atomic Force Microscopy: Interaction Force Vector by Direct Observation of Tip Trajectory", Nano Letters, Oct. 7, 2013, pp. 5106-5111, vol. 13, No. 11.
Sigdel et al., "Tip Trajectory Mapping in Atomic Force Microscopy", Biophysical Journal, Jan. 29, 2013, vol. 104, No. 2.
International Search Report and Written Opinion for PCT/US2015/053453 dated Jan. 1, 2016.

FORCE DETECTION FOR MICROSCOPY BASED ON DIRECT TIP TRAJECTORY OBSERVATION

CROSS-REFERENCE AND PRIORITY CLAIM TO RELATED PATENT APPLICATION

This patent application claims priority to U.S. provisional patent application Ser. No. 62/060,274, entitled "Force Detection for Microscopy Based on Direct Tip Trajectory Observation", filed Oct. 6, 2014, the entire disclosure of which is incorporated herein by reference.

STATEMENT REGARDING FEDERALLY SPONSORED RESEARCH OR DEVELOPMENT

This invention was made with government support under CAREER Award #1054832 awarded by the National Science Foundation. The government has certain rights in the invention.

INTRODUCTION

The atomic force microscope (AFM) is a ubiquitous tool across nanoscience. AFM technique owes its popularity to its combination of high resolution coupled with high versatility—an AFM can operate well in vacuum and in liquid environments, and it can also operate well on conducting and insulating specimens such as biological molecules. A conventional AFM includes sharp tip affixed to the end of a compliant cantilever. However, with conventional AFM, the local three dimensional (3D) position of the tip is not observed and utilized; instead, the conventional AFM measures vertical deflection (bending), $\Delta Z$, of the cantilever away from its equilibrium position. Force is then derived from this cantilever deflection observable, $\Delta Z$, according to Hooke's law which yield the z-component of force as $F_z=k*\Delta Z$.

Thus, in most imaging and spectroscopy applications, force measurements are made in the z direction, i.e., normal to the sample surface. However, torsional deflection (twisting) of the cantilever can also be monitored, as in frictional force microscopy. In both cases, tip motion—which occurs in three dimensions—is convolved into angular displacements of the cantilever. It is challenging to infer 3D tip trajectories from this reduced coordinate system, even if the geometry of the tip and its orientation relative to the sample are known. This is because tip and cantilever dynamics are not always in lock-step with each other as transient excitations can propagate along the flexible cantilever, especially during fast scanning. Furthermore, frictional coupling between the tip and sample causes complex dynamics, such as cantilever bowing and tip slipping that are convolved with the $\Delta Z$ signal.

Despite limitations, researchers have utilized the conventional AFM observables to achieve numerous powerful insights. Three-dimensional AFM represents an exciting capability which, for example, has recently been utilized to measure the force required to move a single atom on a surface in vacuum (see Ternes, M. et al., Science 2008, 319, (5866), 1066-9) and map surface hydration layers in fluid (see Fukuma, T. et al., Phys. Rev. Lett. 2010, 104, 016101). In a powerful implementation, a large amount of frequency shift data are collected at various lateral positions and then analyzed, leading to the assignment of 3D interaction force vectors with atomic precision (see Ternes, M. et al., Science 2008, 319, (5866), 1066-9; see also Albers, B. J., Nature Nanotechnology 2009, 4, 307-310). This process can take hours to complete which limits the types of samples that can be studied as well as the experimental conditions. An alternative approach has reduced the acquisition timescale significantly (see Fukuma, T. et al., Phys. Rev. Lett. 2010, 104, 016101; see also Herruzo, E. T., Nanoscale 2013, 5, (7), 2678-85); however, the method still relies on an inherently one-dimensional observable.

In an effort to improve upon these shortcomings in the art, the inventors disclose a number of inventive embodiments. With example embodiments, the inventors disclose force measurements based on direct local observation of a probe tip, where cantilever deflection need not be measured or observed as part of the force measurement.

In additional example embodiments, the observation of the probe tip is multi-dimensional (e.g., 3D), which permits computation of tip force in multiple dimensions as well. In contrast to conventional AFM, where the tip-sample interaction force is not directly accessible, example embodiments described herein provide direct access to interaction force components in multiple dimensions (e.g., $F_x$, $F_y$, and $F_z$), thereby providing a more complete view of tip dynamics that underlie force microscope operation and form the foundation of a robust multi-dimensional AFM in a plurality of conditions.

As an example embodiment, the inventors disclose an apparatus comprising: (1) a scanning probe microscope, the scanning probe microscope having a moveable tip, and wherein the scanning probe microscope is configured to move the tip in a tapping mode to cause tapping movement for the tip, (2) a position detector, the position detector configured to (i) directly detect the tapping tip, and (ii) generate an output signal indicative of a plurality of positions for the detected tip over time, and (3) a processor configured for operation in conjunction with the position detector, the processor configured to (i) process data representative of the output signal from the position detector, (ii) determine a plurality of positions for the tapping tip over time in at least one dimension based on the processed data, (iii) process the determined tip positions, and (iv) compute a force for the tapping tip in at least one dimension based on the processed tip positions over time. Such an apparatus stands in stark contrast to conventional techniques whereby the tip force computation is based on an indirect estimation of tip position. With such conventional techniques, rather than directly observing movement of the tip itself, the cantilever arm to which the tip is attached is directly observed. From this observation of cantilever detection, assumptions are made about tip position. However, as explained above and below, it is believed that these assumptions lead to inaccuracies with regard such indirect determinations of tip position.

As another example embodiment, the inventors disclose a method comprising: (1) directly detecting a tip of a scanning probe microscope as the tip moves in a tapping mode, (2) based on the direct observations, determining a plurality of positions for the tapping tip over time in at least one dimension, (3) processing the determined tip positions over time, and (4) computing a force for the tapping tip in at least one dimension based on the processed tip positions over time.

With example embodiments, the scanning probe microscope can be used to observe an object via the tapping tip, and the processor is able to compute an isolated force value that is representative of an interaction between the tapping tip and the object under observation. Furthermore, the tip positions can be tracked over time in multiple dimensions (including 3D) to yield force vector computations in multiple dimensions (including 3D). Further still, with example embodiments, the scanning probe microscope can be an AFM. By directly observing the three dimensional tapping mode tip trajectory, 3D force components can be computed without the need for lateral scanning, and example embodiments are capable of rapidly and precisely measuring the interaction force components at arbitrary points in space in a room temperature fluid or in vacuum or air environments. As such, minimal restrictions are placed on experiments. In previous work by the inventors, the force computations were completed around 10 ms after tip observation with a precision of around $\sigma \leq 17$ pN. However, it is expected that with foreseeable improvements in tip technology and the like, embodiments of the invention are capable of even greater speed and precision.

The improved determination of the force provides new information and enhances the accuracy of resulting microscope images, including AFM images. Moreover, AFM that is practiced in accordance with example embodiments described herein permit AFM to be conducted on lipid or protein molecules in their natural, soft states rather than having to solidify them by freezing or crystallization as was done in the past with conventional techniques.

This new capability for force computations based on direct observation of tip trajectories also opens the door to real-space, real-time monitoring of conformational dynamics of atoms, molecules, or larger scale objects and devices.

For example, embodiments described herein can be used to measure the conformational dynamics of biological macromolecules in fluid at physiological conditions (e.g., mapping the way in which a biological macromolecule changes shape during probing by the observed tip). Precise and rapid knowledge of such shape changes would provide immediate insights for the structure-based drug design industry.

As another example for the materials science field, embodiments described herein can use the computed force to monitor detailed time dynamics of a catalyst particle as it undergoes catalytic turn over. Such information would be valuable to the renewable energy research and development sector.

These and other features and advantages of the present invention will be apparent to those having ordinary skill in the art upon review of the teachings in the following description and drawings.

DETAILED DESCRIPTION OF EXAMPLE EMBODIMENTS

Figure 1A:
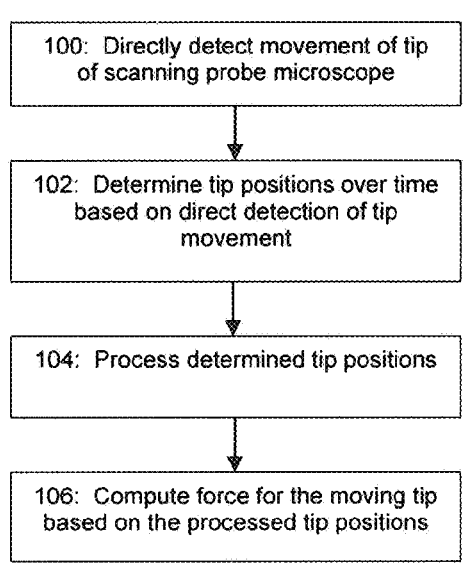
FIG. 1A depicts an example method for directly tracking tip movement and computing tip force in accordance with an example embodiment.

FIG. 1A depicts an example method for an example embodiment whereby tip movement for a scanning probe microscope is directly detected to support the computation of a force for the moving tip. The scanning probe microscope can be any microscope having a probe tip capable of movement, an example of which is an AFM. For example, an AFM such as an ultrastable AFM can be used as microscope 110 (see FIG. 1C).

Figure 1B:
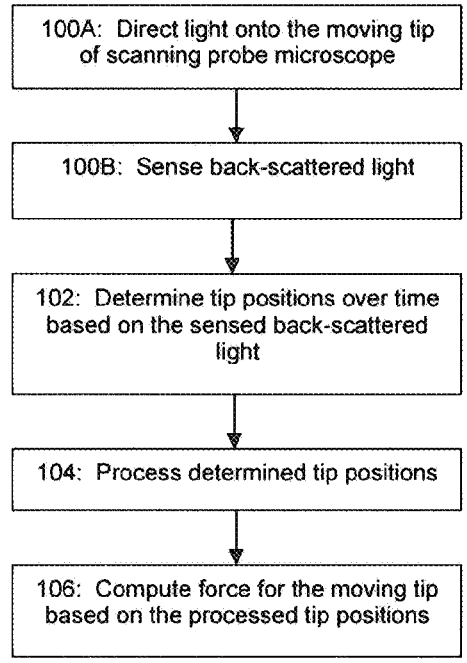
FIG. 1B depicts an example method for directly tracking tip movement via optical techniques and computing tip force in accordance with another example embodiment.
Figure 1C:
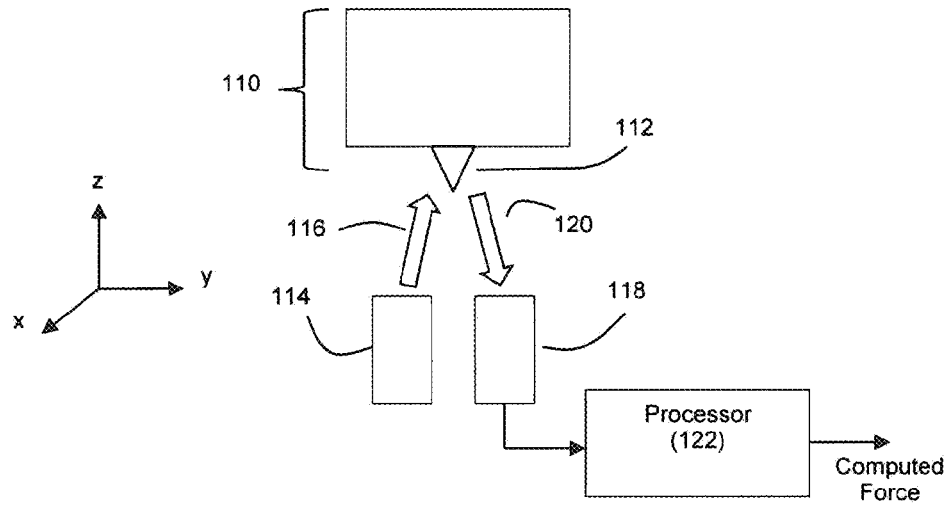
FIG. 1C depicts an example embodiment for an apparatus capable of performing the method shown by FIG. 1B.

At step 100, the tip movement is directly detected by a position detector. Any of a number of techniques can be used for this direct detection of tip position. For example, the tip position can be optically detected and tracked, as described in connection with FIGS. 1B and 1C. FIG. 1B depicts an example method for an example embodiment where tip movement is optically detected, and FIG. 1C depicts an example embodiment of an apparatus capable of performing the method shown by FIG. 1B. As another example, the tip position can be directly detected via capacitance, where a change in tip position will cause a change in detected capacitance, which can be translated into a tip position determination. Further still, other electrical methods can be used to directly detect movement of the tip.

With optical detection, a light source 114 (as shown in FIG. 1C) directs light 116 onto a tip 112 of a scanning probe microscope 110 as the tip 112 moves (step 100A of FIG. 1B). At step 100B, a position sensor 118 senses back-scattered light 120 from the moving tip 112. This back-scattered light has characteristics that are indicative of the position of the moving tip 112, and the position sensor 118 generates one or more output signals indicative of the position for tip 112. The position sensor 118 can be any light-sensitive device capable of sensing the back-scattered light and producing an output indicative of the tip position. For example, the position sensor 118 can be a quadrant photodiode (QPD).

At step 102, a processor (such as processor 122) determines tip positions over time in at least one dimension based the directly detected tip movement. Thus, with the examples of FIGS. 1B and 1C, processor 122 determines the tip positions over time in at least one dimension based on the output signal(s) from the position sensor 118. That is, the determined tip positions are based on the back-scattered light 120 sensed by position sensor 118. The processor 112 may include analog electronic circuitry and a microprocessor or the like, wherein the analog electronic circuitry is configured to convert the output signal(s) from sensor 118 into voltages for further processing by the microprocessor. The microprocessor in turn can be configured to translate these voltages into data representative of the tip positions over time based on known relationships between the voltage values and positioning.

It should be understood that the tip positions can also be determined in multiple dimensions, including, for example, 3D. For example, the microprocessor can be configured to compute a position for the tip along an X-axis ($X_{tip}$), a position for the tip along a Y-axis ($Y_{tip}$), and a position for the tip along a Z-axis ($Z_{tip}$). Furthermore, with reference to FIGS. 1B and 1C, as the tip moves and light from source 114 continues to be back-scattered by tip 112 for sensing by the position sensor 118, the processor 122 will continue to determine tip positions over time in multiple dimensions. As such, the data generated by processor 122 can include a time series of tip positions along the X, Y, and Z axes ($X_{tip}(t)$, $Y_{tip}(t)$, and $Z_{tip}(t)$).

At step 104, a processor (such as processor 122) processes the determined tip positions. For example, this step may include computing the second time derivative of the tip positions over time to yield an acceleration for the tip. In an example embodiment where the tip positions are 3D data, $X_{tip}(t)$, $Y_{tip}(t)$, and $Z_{tip}(t)$, such a second time derivative can yield acceleration data for each dimension.

At step 106, a processor (such as processor 122) computes a force for the moving tip based on the processed tip positions. As an example, step 106 can include computing a force for the tip based on Newton's second law applied to the computed acceleration data. In the 3D example embodiment, this computed force can be a force vector with force components in the X, Y, and Z directions. In this fashion, tip force can be computed based on direct observations of the moving tip trajectory rather than indirectly based on single dimension observation of a cantilever to which the tip may be attached.

Figure 1D:
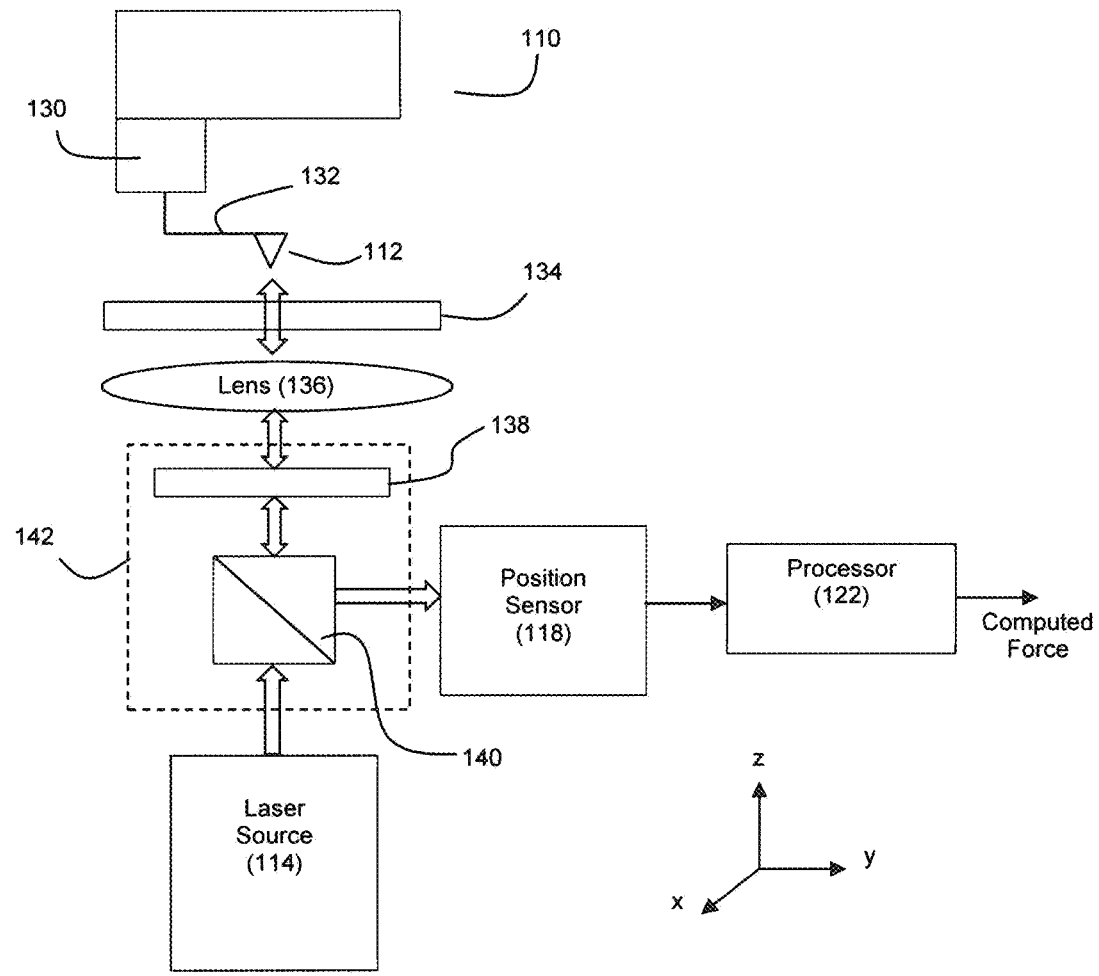
FIG. 1D depicts another example embodiment for an apparatus capable of performing the method shown by FIG. 1B.

FIG. 1D depicts another example embodiment for an apparatus capable of performing the methods shown by FIGS. 1A and B. In this example, the probe tip 112 for the scanning probe microscope 110 is attached to an end of a cantilever arm 132. A piezoelectric transducer (PZT) 130 is configured to drive the cantilever arm 132 and thus cause movement of the tip 112. In example embodiments, the PZT can drive the cantilever arm 132 in a tapping motion known as tapping mode. This tapping mode causes the tip 112 to move toward the surface 134 and come into intermittent contact with surface 134. While PZT 130 is used in this example embodiment to drive the tip 112 in a tapping mode, it should be understood that other techniques could be used to create the tapping mode for the tip 112. For example, photothermal techniques could be used to drive the tip 112 in a tapping mode. As an example of a photothermal technique, a laser can be targeted onto the tip 112 to cause the tip to move at a desired frequency.

As discussed below, an object being observed by the microscope 110 may be located on this surface 134. It is believed that the combination of direct detection of tip movement to compute tip force with the tip moving in a tapping mode is a particularly powerful embodiment as this combination permits useful observation of biological phenomena in environments that more akin to their natural physiological environments. For example, denaturing a sample such as through crystallization can be avoided if desired by a practitioner.

In an example embodiment, the computed force can be a force representative of the interaction of the tapping tip 112 with an object or sample under observation by the microscope ($F_{tip-sample}$). The observation of tip positions can be related to force via a generalized form of Newton's second law: $\Sigma \vec{F} = m_{eff}^i * \vec{a}^i$, where $m_{eff}^i$ is the effective mass for each degree of freedom of the tip, for example, i=x, y, and z, and can be assigned via a simple harmonic model:

$$m_{eff}^i = \frac{k_i}{\omega_i^2}$$

Where $k_i$ is the effective spring constant for each degree of freedom and $\omega_i$ is the resonance frequency of the each respective mode. More specifically, the manner in which force is determined is shown by the equations (1), (2), and (3) below. While the microscope operates in a tapping mode (such as a light tapping mode where there is no or negligible DC deflection of the cantilever 132), the tip 112 will intermittently come into contact with the surface 134 or object/sample under observation. Equation (1) shows the sum of all of the forces acting on the tip when the tip is very close to (for example, 15 nm above) but not yet touching or tapping the surface.

$$\vec{F}_{drive} + \vec{F}_{damping} + \vec{F}_{spring} = m_{eff}^i \vec{a}_{off} \quad (1)$$

This sum of forces is equated to the effective mass multiplied by the acceleration of the tip while off the surface or object/sample, $a_{off}$. The forces acting here are the driving force of the tapping mode oscillation, the damping force from hydrodynamic coupling (if the observation is being performed in an aqueous environment; it should be understood that when the environment is a vacuum or air, this damping force approaches zero), and the spring force from the cantilever. The right hand side of this equation is the effective mass of the tip times the tip acceleration vector while the tip is off the surface or object/sample, $a_{off}$. Also, it should be understood that the right side of equation (1) can be determined via the direct detection of tip trajectory as described herein.

Next, when the tip 112 is brought into intermittent contact with the sample, a new force term is introduced, the tip-sample force ($F_{tip-sample}$). Equation (2) below characterizes that interaction.

$$\vec{F}_{tip-sample} + \vec{F}_{drive} + \vec{F}_{damping} + \vec{F}_{spring} = m_{eff}^i \vec{a}_{on} \quad (2)$$

In this case, the acceleration vector represents the acceleration while the tip is contacting or "on" the surface or object/sample, $a_{on}$. Once again, it should be understood that the right side of equation (2) can be determined via the direct detection of tip trajectory as described herein.

This system of equations can be solved to isolate the tip-sample force according to Equation (3) below, which relates the tip-sample force to the difference in acceleration when the tip is off the surface/object/sample and when the tip is on the surface/object/sample.

$$\vec{F}_{tip-sample} \approx m_{eff}^i (\vec{a}_{off} - \vec{a}_{on}) \quad (3)$$

As such, the isolated tip-sample interaction force can be computed from the directly detected tip positions over time according to Equation (3).

In an example embodiment, the time-average value of the amplitude of the tip-sample force can be determined according to:

$$\left\langle \sqrt{\vec{F}_{tip-sample}^2} \right\rangle \approx m_{eff}^i \left\{ \left\langle \sqrt{\vec{a}_{off}^2} \right\rangle_{60\,ms} - \left\langle \sqrt{\vec{a}_{on}^2} \right\rangle_{10\,ms} \right\}$$

In this example, the amplitude of the tip acceleration vector is averaged for 60 ms to establish an off surface reference acceleration and then the subsequent on surface acceleration is time averaged for 10 ms (or about 10-100 oscillations of the tapping tip 112).

As such, these example embodiments are capable of directly computing the magnitude and direction of the tip-sample force, which was not previously directly accessible via the cantilever deflection, $\Delta Z$. This new capability opens the door to studying highly time-dynamic samples such as proteins and other biological macromolecules.

In the example embodiment of FIG. 1D, the surface 134 is configured to pass light therethrough. For example, the surface 134 may be a clear glass surface or the like. With this arrangement, a light source (e.g., laser source 114) that directs light onto the tip 112 can be positioned such that the surface 134 is located optically between the tip 112 and the laser source 114. Thus, the laser light projected by laser source 114 will pass through surface 134 before striking tip 112.

A lens 136 and optical isolator 142 may also be positioned optically between the laser source 114 and the surface 134 as shown by FIG. 1D. Also in optical communication with the tip via surface 134, lens 136 and optical isolator 142 can be the position sensor 118. With this arrangement, the optical isolator 142 is positioned and configured to optically separate light propagating toward the tip 112 from the back-scattered light propagating away from the tip 112. The optical isolator may include a quarter wave plate 138 and a polarizing beam splitter (PBS) 140. The PBS 140 can direct the back-scattered light toward the light-sensitive position sensor 118 while directing the laser light from laser source 114 toward the tip 112. The lens 136 can be positioned and configured to focus the laser light from laser source 114 onto the tip 112 while also collecting the back-scattered light from the tip 112. In this fashion, while laser source 114 is directing light onto the tip 114, the position sensor 118 can also be sensing the back-scattered light from the tip to support the force computation by processor 122.

Figure 1E:
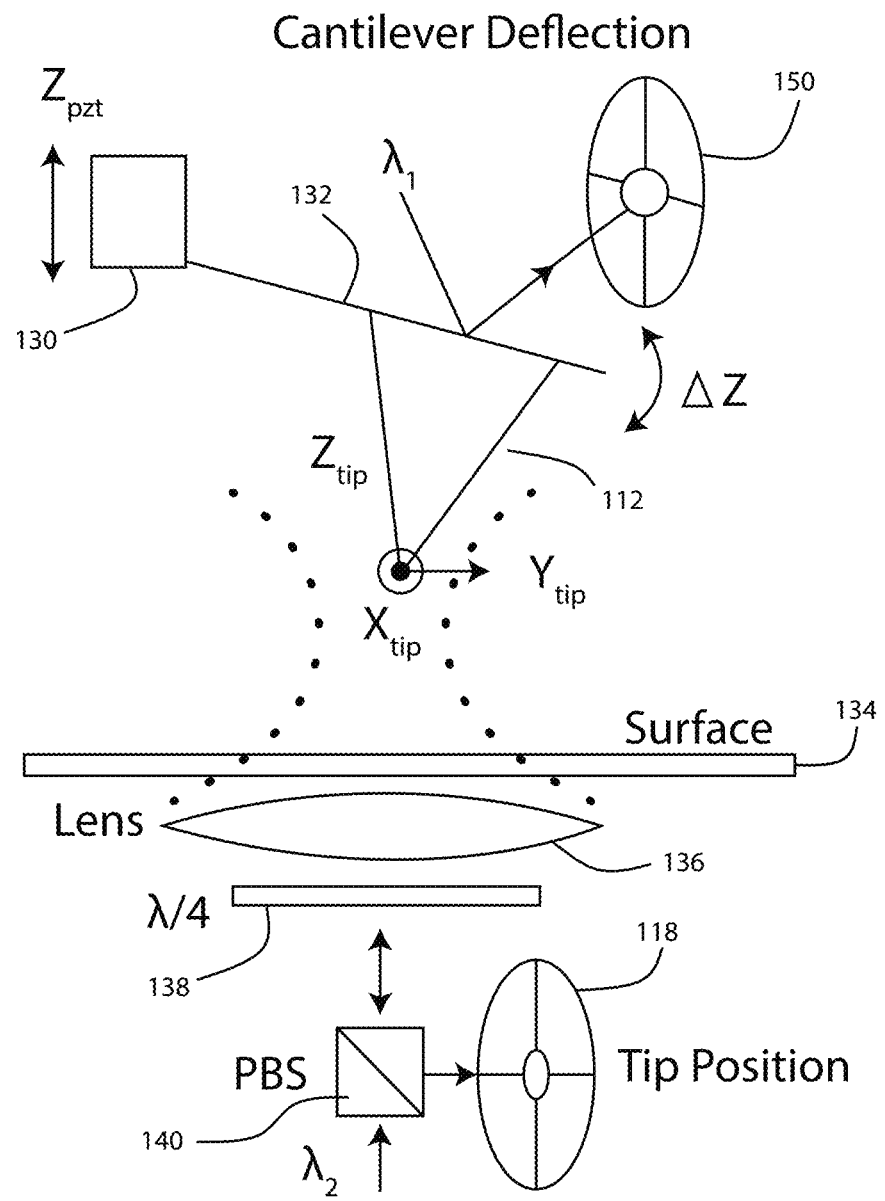
FIG. 1E depicts an exploded view of an apparatus with respect to tip dynamics observed by an example embodiment.

FIG. 1E shows an example arrangement that builds upon ultrastable AFM, a recently developed technique that was inspired by surface-coupled optical trapping microscopy methods. (See King, G. M. et al., Nano Letters 2009, 9, (4), 1451). Ultrastable AFM employs a focused laser that back-scatters off the tip itself to rapidly yield tip position with high spatial precision in 3D. In previous work, this tip-position data was used to stabilize the tip with respect to a surface in contact mode and in air. (See King, G. M. et al., Nano Letters 2009, 9, (4), 1451). With this example embodiment, the inventors extend that work for an AFM operating in a tapping mode in fluid, where the inventors apply the 3D positional data to achieve different ends. In such example embodiments, measurements of 3D tip trajectories permit determination of spring constants, resonance frequencies, and effective masses for the three degrees of freedom of the tip. As explained above, measurements of tip acceleration in 3D allow determination of the 3D interaction force by applying Newton's second law of motion.

A schematic diagram of such an example apparatus is shown in FIG. 1E. As with conventional AFM, a laser beam ($\lambda_1$=785 nm) was reflected off the backside of the cantilever and incident upon a quadrant photodiode (QPD) to yield $\Delta Z$, the cantilever deflection away from equilibrium. It should be understood that example embodiments of the invention need not employ this laser targeting the cantilever backside. However, for purposes of experimentation and comparison, it can be helpful to include the laser to measure $\Delta Z$. In addition to this standard optical lever arm, another laser ($\lambda_2$=810 or 845 nm) from a laser source 114 is used to directly measure the tip position. The $\lambda_2$ laser was focused onto the region of the tip apex using an objective lens 136 (numerical aperture=1.4, 100×, oil immersion, Nikon).

Back-scattered light, collected by the same lens 136, was separated from the forward propagating light using an optical isolator that comprises a quarter wave plate 138 ($\lambda/4$) and a polarizing beam splitter (PBS) 140, and the back-scattered light was directed onto a separate QPD 118. The QPD thus generated data indicative of tip position in three dimensions.

Analog electronics output three voltages from this QPD 118: Vx and Vy which are proportional to the normalized lateral differences in optical power on the QPD halves, and Vz which is proportional to the total power incident on all four quadrants of the QPD 118. Separate line filters (not shown) placed in front of the QPDs prevented cross-talk between the lasers, which each supplied approximately 1 mW of power to the measurement point. Stabilized laser diode sources were used. A small piezoelectric (pzt) actuator (2×2×2 mm$^3$, Physik Instrumente, not shown) affixed to the tip holder drove tapping mode oscillations. The position of the base of the cantilever 132 and that of the sample stage were controlled by two closed-loop three-axis piezo electric stages (P363.3CD and P733.3DD, respectively, Physik Instrumente). Unless stated otherwise, experiments were performed in physiologically relevant conditions (aqueous buffer: 10 mM Tris pH=7.6, 300 mM KCl). Two types of commercial AFM cantilevers 132 were used (MSNL E & F, Bruker). Instrument automation was achieved using software (LabVIEW).

While the examples of FIGS. 1C-E show the position detector being positioned beneath the sample, it should be understood that the geometry of the apparatus could be inverted or otherwise re-arranged so that the position detector is positioned above the sample or to the side of the sample rather than underneath.

Figure 1F:
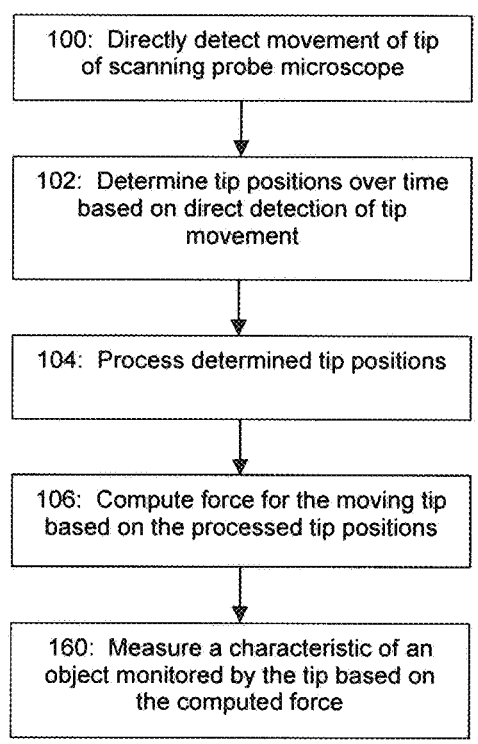
FIG. 1F depicts an example method showing how the computed force can be leveraged to measure a characteristic of an object being monitored by the probe tip.

FIG. 1F depicts an example method showing how the computed force can be leveraged to measure a characteristic of an object being monitored by the probe tip. Steps 100-106 can proceed as described in connection with FIG. 1A. At step 160, a characteristic of object being monitored by the tip 112 is measured based on the computed force. As noted above, the example embodiments open the door to a wide variety of useful object characteristics that can be measured. For example, real-space and real-time monitoring of conformational dynamics of atoms, molecules, or larger scale objects and devices can be performed. Also, the conformational dynamics of biological macromolecules in fluid at physiological conditions can be measured. For example, step 160 can include mapping the way in which a biological macromolecule changes shape during probing by the observed tip. As another example, step 160 can include monitoring detailed time dynamics of a catalyst particle as it undergoes catalytic turn over. It should be understood that these are just examples of many characteristics that can be measured based on the computed force.

Figure 2:
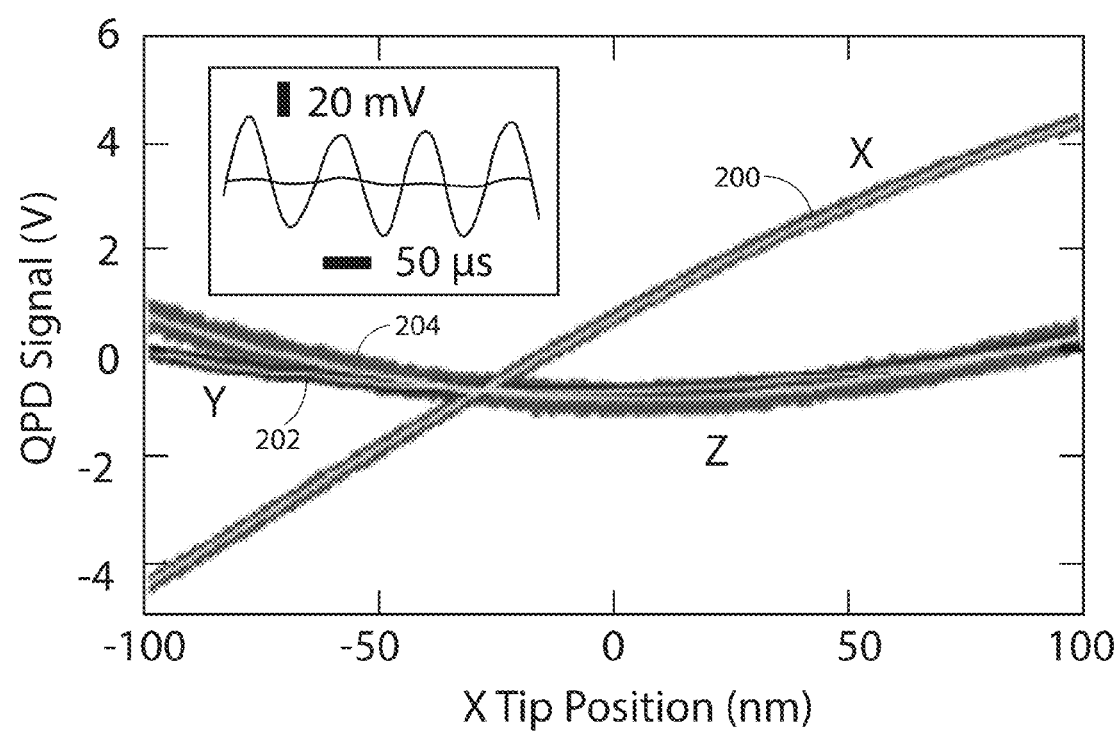
FIG. 2 depicts an example cross section of a calibration volume showing the tip position detection output as a function of tip position along the x-axis (keeping y and z stationary).

To facilitate accurate 3D measurements, the tip position is calibrated prior to use. For this purpose, a tapping tip 112 was scanned through a 3D volume (100×100×100 nm$^3$) to collect the QPD detector response Vx, Vy, Vz as a function of tip position. This process took <3 min to complete. FIG. 2 shows a cross section through a typical calibration volume. The tip 112 was traveling along the x-axis and all three voltage signals are displayed. The Vx signal 200 increased approximately linearly, whereas the off-axis signals (Vy 202;

Vz 204) were relatively flat (<20% crosstalk). The 12.1 kHz tapping mode drive frequency is clearly apparent (see FIG. 2, inset); however, these oscillations rapidly averaged to well-defined means. For example, Vx achieved a 6 mV standard deviation in 4 ms, a noise level corresponding to 150 pm positional precision on this timescale. The averaged voltage signals (FIG. 2, light lines within 200, 202, and 204, low pass filter corner frequency flp=250 Hz) were used for 3D tip position calibration throughout the volume via a polynomial fitting algorithm (see Appendix, Sections 2 and 4 for details). Nanoscale fiducial marks (~50 nm tall, ~700 nm diameter, amorphous silicon) patterned on the glass surface in a 10 micron grid allowed precise laser positioning along the z-axis that ensured robust and reproducible calibrations. For completeness, cross sections through the y- and z-axes of the calibration volume are also shown (See Appendix, Section 4 and FIG. 6). The inventors note that the averaged tapping mode signals are essentially identical to those acquired in contact mode, i.e., in the absence of a mechanical driving force (See Appendix, Section 5 and FIG. 7). The root mean square (rms) residual error between the fits and actual position of the tip were <1 nm on each axis over the calibrated range. Thus, highly linear and orthogonal detection of the tip position was achieved in the presence of tapping mode oscillations and crosstalk.

Figure 3A:
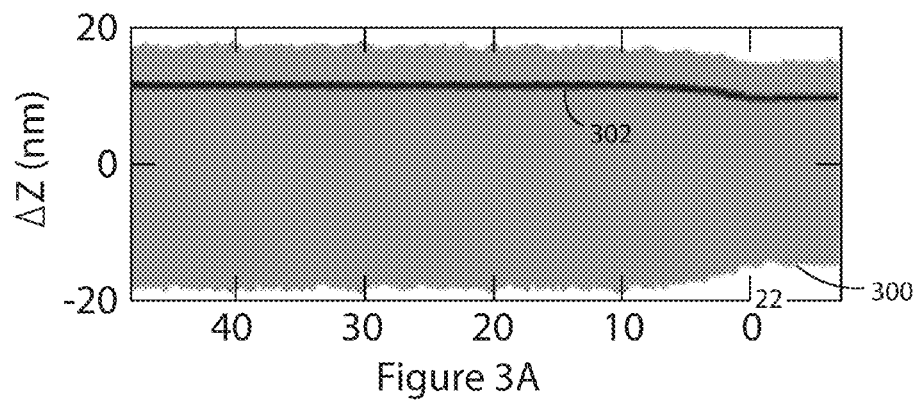
FIGS. 3A-C show example plots relating to 3D tip trajectory during force spectroscopy.
Figure 3B:
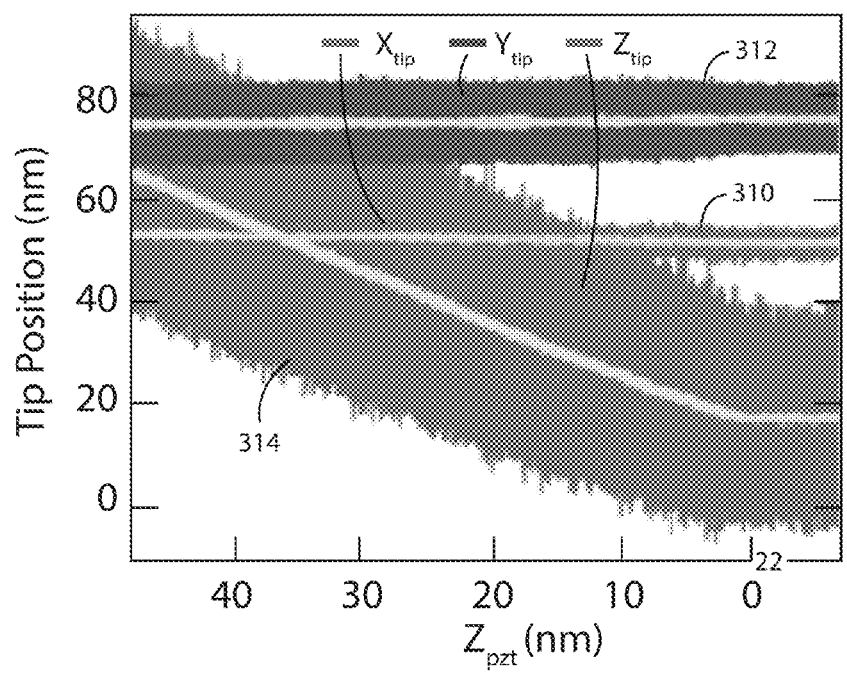

Force spectroscopy can provide a precise window into molecular-scale energy landscapes, and tip trajectory mapping adds valuable new data to a traditional force spectrum. In this mode, the base of the cantilever 132 is repeatedly advanced towards (and retracted from) a surface 134 using a piezoelectric nanopositioning stage (e.g., PZT 130). In addition to recording $\Delta Z$ and its amplitude as a function of Zpzt stage position (FIG. 3A, plots 300 and 302, respectively), the 3D position of the tapping MSNL-F tip was measured as it was advanced at a rate of 50 nm/s towards a clean glass surface 134 in aqueous buffer solution (FIG. 3B). As expected, the amplitude of $\Delta Z$ was reduced upon interaction with the surface (see FIG. 3A, plot 202). This dependence forms the basis of tapping mode imaging feedback. It should be understood that the zero point of Zpzt is arbitrary; the tip halted its advance when a predetermined $\Delta Z$ amplitude reduction was achieved. The tip was then held in intermittent contact with the surface for a period of time and retracted and this cycle was repeated (see Appendix; Section 6 and FIG. 8 for full cycle data). The inventors have also observed asymmetric behavior of the $\Delta Z$ signal during intermittent contact (see Appendix, Section 7 and FIG. 9), an issue which has been discussed. (See Stiernstedt, J. et al., Rev. Sci. Instrum. 2005, 76, 083710).

FIG. 3B shows simultaneously acquired 3D tip trajectory data during tip advance (Xtip 310, Ytip 312, and Ztip 314). Full bandwidth data (sampling rate: 690 kHz) are drawn in dark colors; low pass filtered data (flp=1 kHz) are overlaid in light. The traditional observable $\Delta Z$ yields little information when the tip is out of contact with the surface; however, Ztip exhibits a steep linear slope when the tip is above the surface and advancing. The commanded tip advance rate (50 nm/s) applied to the Zpzt can be compared to the locally-measured rate. The disparity between them (10% in this case) becomes increasingly pronounced at low (drift-limited) pulling velocities, such as 1 nm/s or less, that have been used in state-of-the-art biophysical experiments. In terms of average lateral tip positions, no significant motion was detected as the tip came into intermittent contact with the surface; however, the lateral amplitudes were altered. Interestingly, significant Ytip "slipping" along the surface was measured in contact mode approach curves (see Appendix, Section 8 and FIG. 10), an observation which portends applications in tribology. For example, AFMs have been used to study friction at nanometer length scales, but the usefulness of such measurements have been limited due to the convolution of the traditional $\Delta Z$ signal with tip's slipping/sticking characteristics. However, with example embodiments described herein, the direct detection of tip position provided deconvolving of tip slipping and sticking motion so that the force computation will support more precise measurements of atomic and/or molecular scale friction and material wear with respect to a sample.

Figure 3C:
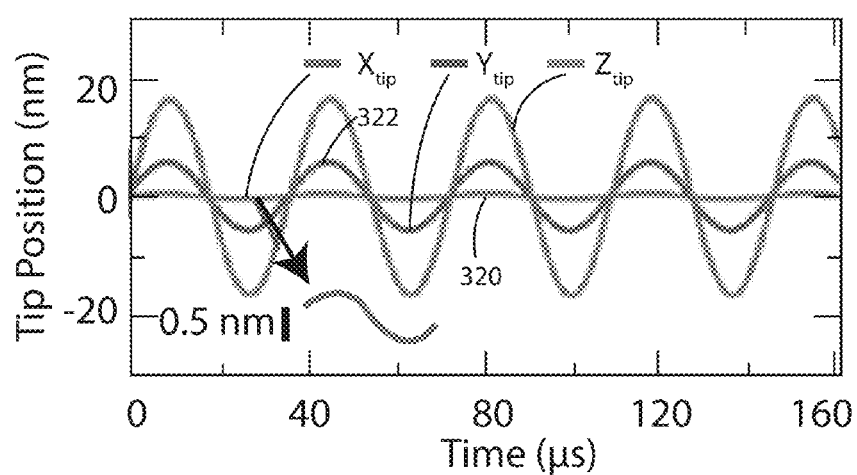

To provide an instantaneous view of tip dynamics, FIG. 3C shows the 3D position of the oscillating tip stationed 30 nm above the surface in the X, Y, and Z dimensions (see plots 320, 322, and 324, respectively). The data was filtered in a 1 kHz wide band about the 27.5 kHz drive frequency (i.e., high pass cut off fhp=27 kHz, low pass cut off flp=28 kHz, 5th order). The largest amplitude observed was in the z direction (12 nm), but the Ytip amplitude was also significant (4.0 nm) owing to the angle ($\alpha=17°+/-1°$) built into the tip fixture of the subject AFM. This angle ensures that the tip contacts the surface first; most commercial AFM's have built-in angles, typically ~15°. The amplitude of Xtip was 2.8 Å. Though small, this is significantly above the noise floor of the measurement, which was ~0.15 Å between 26 and 29 kHz, as determined by integrating the power spectral density (See Appendix, Section 9 and FIG. 11). It should be noted that variations in conditions (e.g., drive frequency, drive amplitude, tip selection) altered the relative amplitudes of the tip trajectories.

Figure 4:
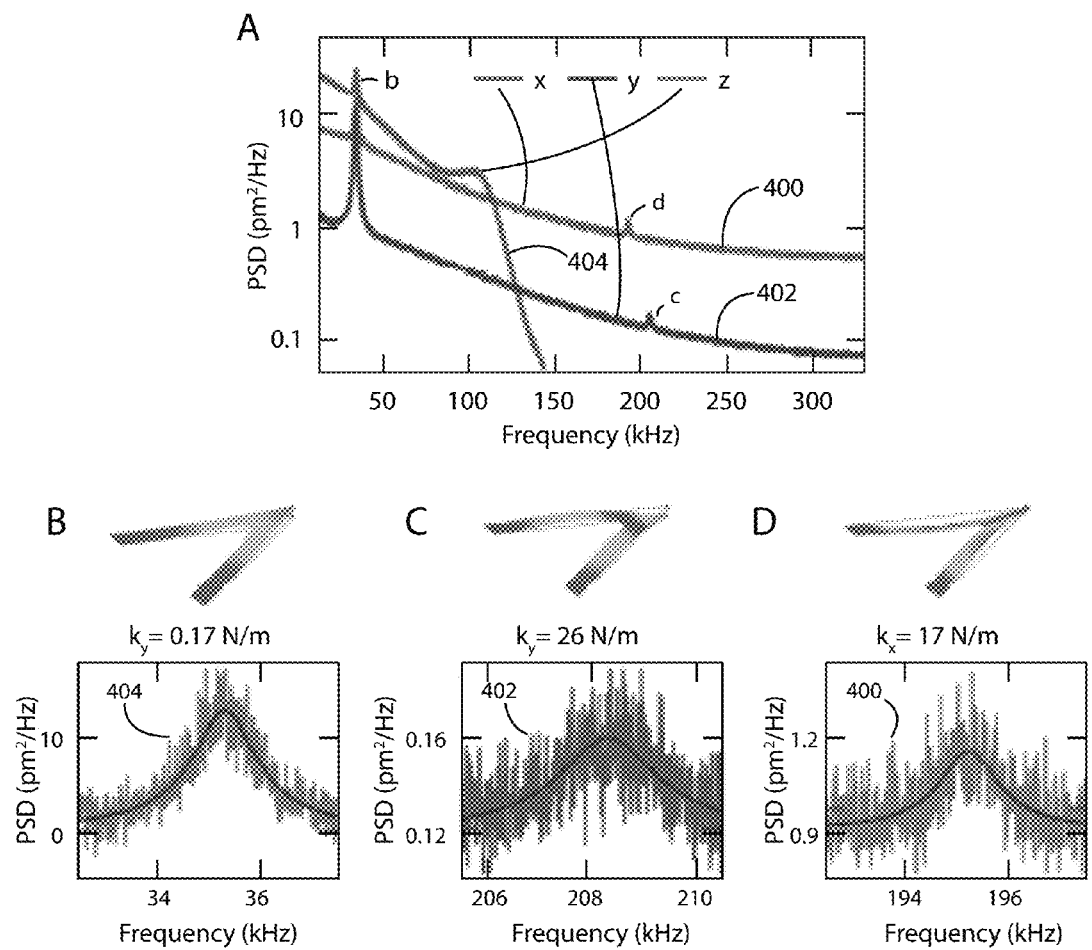
FIG. 4 shows an example measurement of cantilever spring constants in three dimensions.

Determining force in AFM generally requires knowledge of the cantilever spring constant. In some example embodiments, a practitioner may choose to use theoretical cantilever spring constants. However, in other embodiments as described herein, it should be understood it is possible to directly measure the 3D spring constants kx, ky, and kz. To achieve this, the positional fluctuations of a thermally driven tip which was stationed 1 micron above a surface at room temperature were monitored. Peaks were identified in the power spectral density (PSD) of this data corresponding to three principal modes of the MSNL-E tip (FIG. 4). Harmonic oscillator fits (see to Riet, J. et al., Ultramicroscopy 2011, 111, 1659) to each of these peaks operate to produce the 3D spring constants.

FIG. 4 shows (A) power spectral density of the 3D positional fluctuations of a thermally driven tip in x (400), y (402) and z (404). Data acquired approximately 1 micron above the surface in air; the corner frequency of the z-detection electronics (100 kHz) was set lower than the two lateral channels and is clearly visible. The labeled points b, c, and d represent the resonance peaks which are magnified in panels (B), (C), and (D), respectively. 3D spring constants and resonance frequencies were deduced from simple harmonic oscillator fits (panels B-D, black lines). Illustrations of the corresponding modes of the cantilever are also displayed. Note: all axes are linear, except the vertical axis of panel (A), which is logarithmic.

To optimize acquisition, data was acquired sequentially on each axis, in air, and a simplified (linear) calibration procedure was used (see Appendix, Section 3 for details). The experimentally measured spring constants were kx=17±8 N/m, ky=26±9 N/m, and kz=0.17±0.01 N/m (average+/−$\sigma$). The cantilever geometry and well known material parameters were used to corroborate these measurements via analytical calculations (see Neumeister, J. M. and Ducker, W. A., Rev. Sci. Instrum., 1994, 65, 2527) as well as finite element modeling (COMSOL). In these cases, the theoretical spring constants were within a factor of two of experimentally determined values.

Figure 5A:
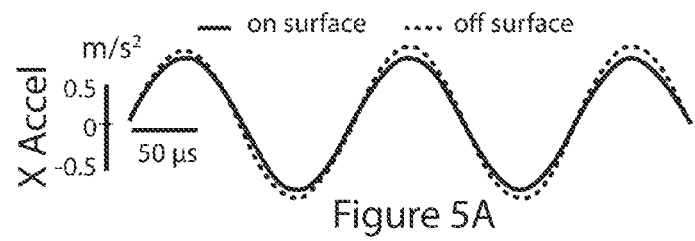
FIGS. 5A-J show example plots relating interaction force vectors computed from directly observed tip trajectories on glass and lipid surfaces.
Figure 5B:
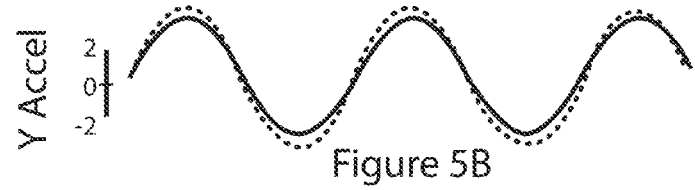
Figure 5C:
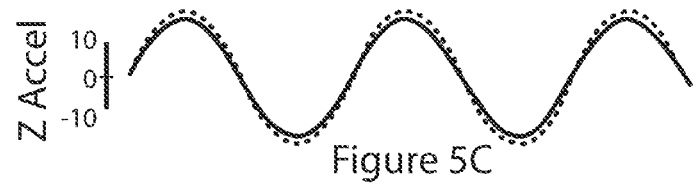
Figure 12:
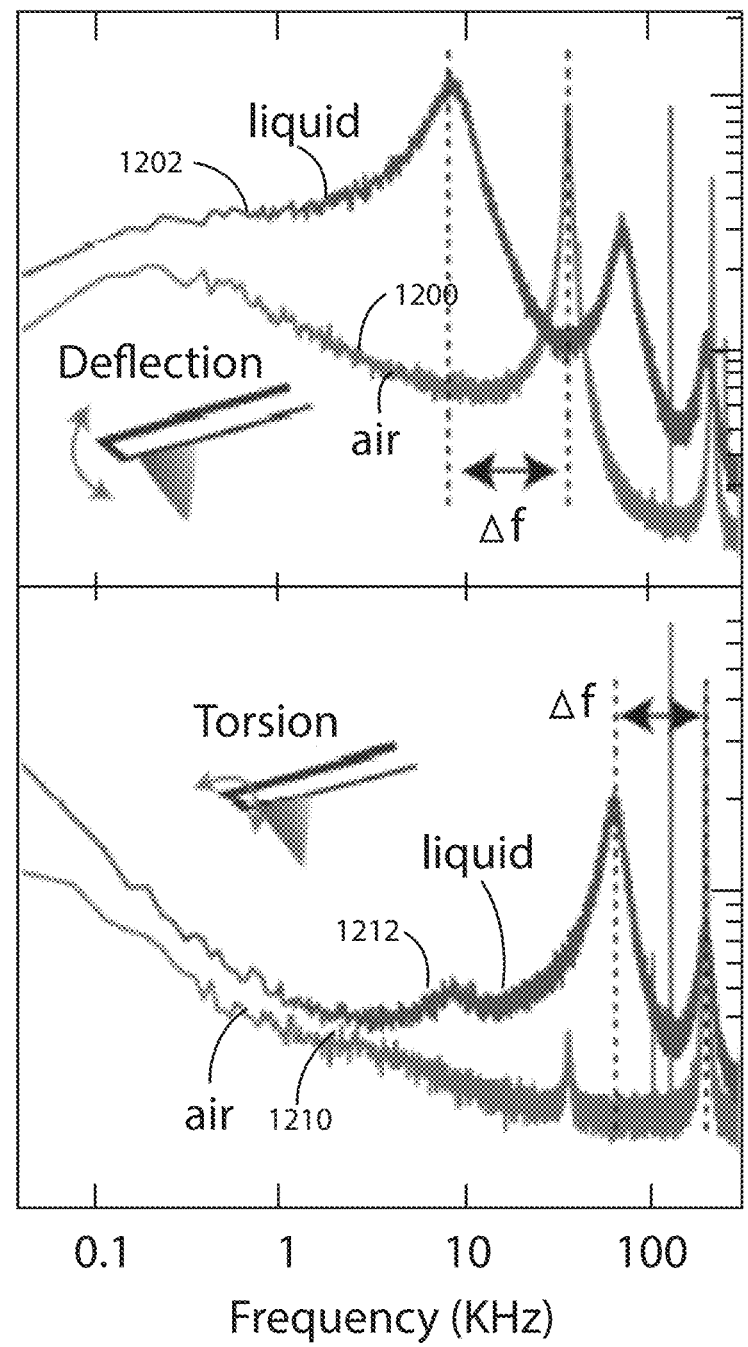

Finally, the interaction force vector was deduced directly from the measured tip trajectory Xtip(t), Ytip(t), and Ztip(t). The second time derivative of these positions provides a mechanism to deduce the interaction force components via Newton's second law, e.g., $F_x = m_x \ddot{X}_{tip}(t)$. FIGS. 5A-C display the 3D acceleration of an MSNL-E tip when positioned 15 nm above (dashed) and in intermittent contact with (solid) the surface. As before, data was bandpass filtered about the drive frequency (6 kHz): 1 kHz window, 5th order. The difference between acceleration amplitudes was deemed to be proportional to the tip-sample interaction, although hydrodynamic damping from the surrounding medium could also contribute (e.g., increased viscous drag due to the fluid boundary layer). An effective mass for each degree of freedom $m_x=1.1(\pm 0.5) \times 10^{-10}$ kg, $m_y=1.4(\pm 0.5) \times 10^{-10}$ kg, $m_z=5.3(\pm 0.3) \times 10^{-11}$ kg, followed from a harmonic model, e.g., $$m_x = \frac{k_x}{\omega_{ox}^2},$$

where $\omega_{ox}$ is the fundamental angular frequency of the x mode in fluid (see Appendix Section 10 and FIG. 12). Due to the fluid, these effective masses are larger than the static mass of the beam $m_{beam} \approx 1 \times 10^{-11}$ kg, estimated from the cantilever's dimensions and density. In the absence of damping, the ratio of the effective ("lumped") mass to the distributed mass of a (rectangular) cantilevered beam is 0.23. (See William, J. Paul, Mechanical Vibration, John Wiley and Sons, Inc., 2007). Based on the measured (3-fold) reduction in resonance frequency in going from air to fluid, it is estimated that the ratio of the effective mass in water to the distributed beam mass (m_eff^H2O)/(m_eff^air)×(m_eff^air)/m_beam≈2.

Figure 5D:
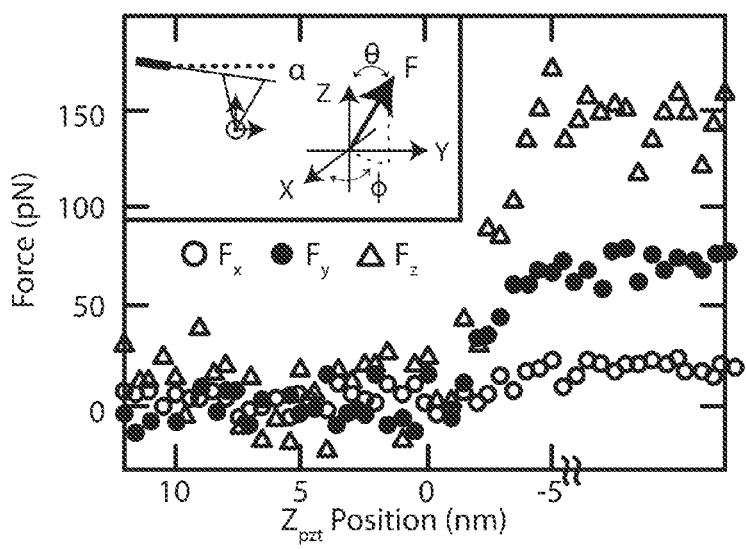

To determine the 3D force experienced by the tip, the rms amplitude of the 3D tip acceleration was averaged for 60 ms with the tip positioned 15 nm above the surface (i.e., point of closest tip approach=15 nm). The amplitudes of this "off surface" reference vector were 0.59±0.03 m/s², 2.85±0.06 m/s², and 12.1±0.2 m/s² in x, y, and z, respectively. Subsequently, the average acceleration amplitudes (determined in continuous 10 ms time windows, ~60 tip oscillations) were subtracted from the "off surface" reference accelerations and multiplied by the appropriate effective masses to yield 3D force components as a function of Zpzt position during a 50 nm/s advance curve (FIG. 5D). FIG. 5D shows the components of the three-dimensional force as a function of the height of the tip's base, Zpzt. The axis is discontinuous after Zpzt=−5 nm, indicating where the tip advance was halted.

Thus, each data point represents the average force magnitude (flp=100 Hz) along each axis. Positive forces indicate a reduction in tip acceleration amplitudes upon interaction with the surface. When held in intermittent contact with the glass surface at Zpzt=−5 nm for 0.25 s, the average magnitude of the normal force component Fz was 152 pN. This value is similar to the magnitude estimated using the traditional observable (132 pN, based on the change in ΔZ amplitude (1.10 nm) and the ΔZ measured spring constant: k=0.12 N/m), corroborating the trajectory-based force analysis disclosed herein. It should be noted that this example involves soft tapping applications (desirable in many biological studies) in which the DC deflection of the tip is negligible. Further, this example analysis assumes that the effective masses and the viscous damping do not vary significantly over the distance (15 nm) that separates the "off surface" reference acceleration determination from the measurement point.

The bandpass filtered data shown (see FIGS. 5A-C and 5F-H) appear largely harmonic and symmetric. However, underlying complexity in the motion becomes evident when the filtering is relaxed (see Appendix, Section 11 and FIG. 13). Narrow bandpass filtering excludes higher harmonic contributions; therefore, nonlinearities are not expected to contribute to the interaction analysis. In terms of precision, the rms noise for each force component was σx=5 pN, σy=9 pN, and σz=17 pN (Δf=4-100 Hz). This noise changed by <10% when calculated above and in intermittent contact with the surface, thus the internal feedback to the piezoelectric stages did not contribute substantially to the measured force noise.

Significant forces acted on the tip in both lateral directions. The force in the y-direction (i.e., nearly parallel to the long axis of the cantilever) achieved a maximum value of ~74 pN, which is approximately half of the value of the normal force. This is 60% larger than expected based on the angle α=17° built into the apparatus (see FIG. 5D, inset). The x-component of the interaction rose to 13% of the normal force. Thus the measured force vector tilted considerably away from the surface normal.

Figure 5E:
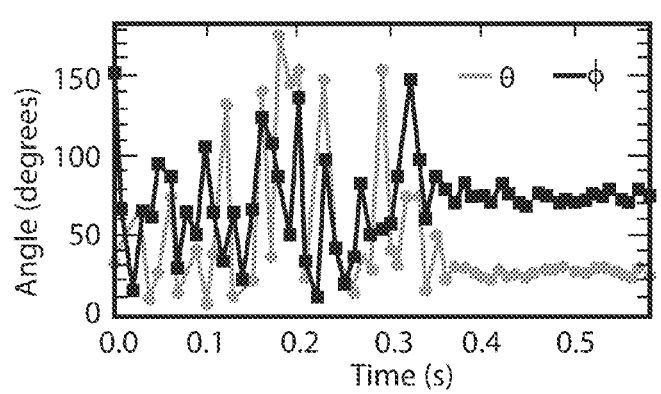

The orientation of a vector in three-dimensional space can be defined by two angles, a $$\text{polar angle } \cos\theta = \left(\frac{F_z}{F}\right)$$

and an $$\text{azimuthal angle } \cos\Phi = \left(\frac{F_x}{F\sin\theta}\right),$$

where $F=\sqrt{F_x^2+F_y^2+F_z^2}$. Therefore a polar coordinate system was adopted with the origin at the tip apex (see FIG. 5D, inset). FIG. 5E shows a time course of these two angles while the tapping tip was advanced towards the glass surface. Intermittent contact was established with the surface 134 at t~340 ms. The advance rate was held constant $\dot{Z}_{pzt}=50$ nm/s until t=440 ms, at which point it was halted ($\dot{Z}_{pzt}=0$). As the data indicate, the direction of the interaction was ill-defined initially; however, the pointing noise of the force vector rapidly quenched at t~340 ms, corresponding to the onset of intermittent contact with the surface. Thus, the orientation of the force vector was established early upon interacting with the surface and was relatively stable thereafter (see FIG. 5J). FIG. 5J shows visualizations of the interaction force vector at locations of decreasing tip-sample height above a glass surface (Zpzt=−1, −2, −3, −4, and −5 nm, respectively) showing the rapid suppression of the force pointing noise after initial interaction with the surface.

At Zpzt=−5 nm, the average values of the angles were θ=28°+/−3° and Φ=75°+/−3°, where the uncertainty in direction (pointing noise) of the force vector is the standard deviation of the angles in a bandwidth Δf=4-100 Hz. The static geometry built into the apparatus implied that θ should be equal to α=17° and likewise that Φ=90° (the built-in angle in the x-direction equals zero). Surprisingly, the measurements revealed that θ was 11° larger than expected and Φ differed by 15°. It should be understood that in the current analysis, which is based on time averaged acceleration amplitudes, an interaction emanating from the positive x-direction results in an equivalent signal to the same interaction acting from the negative x-direction. Hence, there is a 2-fold degeneracy in the assignment of angle Φ, it is either 75° or 105° (i.e., specified up to a reflection about the y-axis).

Figure 5F:
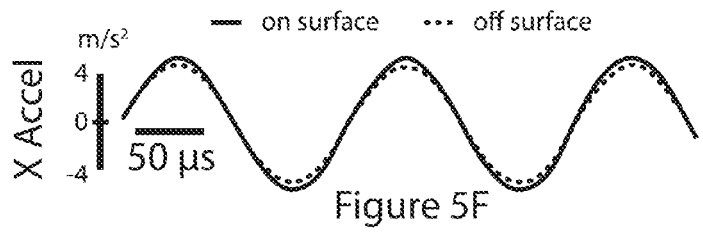
Figure 5G:
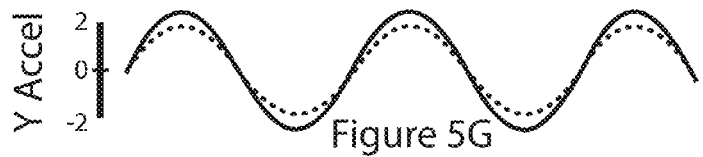
Figure 5H:
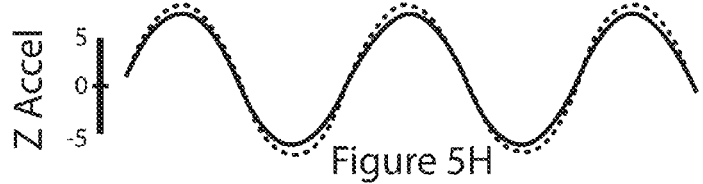
Figure 5I:
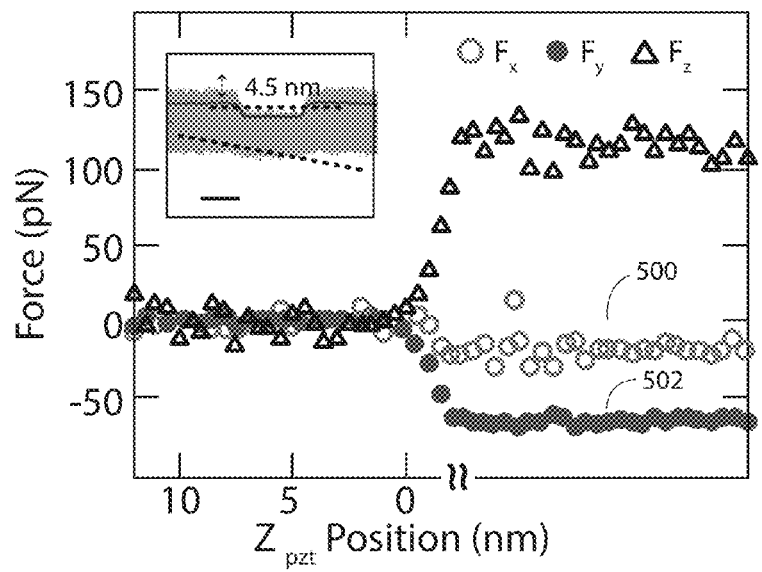
Figure 5J:
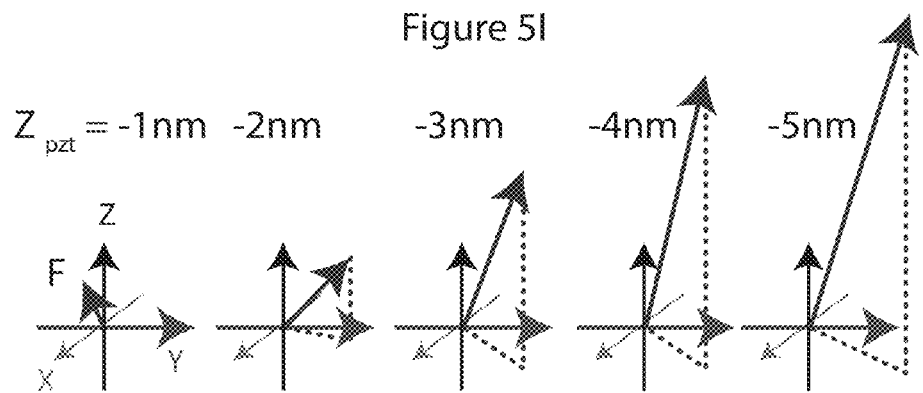

As another application relevant to the biophysics community, the 3D tip trajectory was measured as a tapping tip encountered a lipid bilayer surface (see FIGS. 5F-I). FIGS. 5F-5H show 3D tip acceleration data acquired on and 15 nm above a lipid bilayer surface (bandpass filtered 1 kHz about the drive frequency: 9 kHz). FIG. 5I shows computed 3D force components experienced by the tip when advanced towards the lipid membrane surface are shown. A cross section line scan through an image (see FIG. 5I, inset; scale bar=200 nm) of the lipid sample confirms the presence of a 4.5 nm high lipid bilayer.

In this example, lipid vesicles consisting of 1-palmitoyl-2-oleoyl-sn-glycero-3-phosphocholine (POPC, Avanti Polar Lipids, Inc.) were extruded and then deposited onto clean glass surfaces (see Appendix). As noted, a representative image (see FIG. 5I, inset) shows a ~4.5 nm step, confirming the presence of a bilayer. Finally, 3D force spectroscopy was performed in a manner identical to that described for glass in connection with FIGS. 5A-D. While the normal force components Fz behaved similarly on the two samples, the lateral components on lipid diverged significantly from their previous behavior on glass. Interestingly, in this lipid case, the x and y acceleration amplitudes on the surface were larger than those measured 15 nm above (see FIGS. 5F & G, compare dashed and solid lines). This gives rise to negative lateral force magnitudes in our analysis (see FIG. 5I, 500 and 502 for $F_x$ and $F_y$, respectively). The inventors posit that this phenomenon is due to cantilever mode mixing facilitated by the unusual mechanical properties of the lipid bilayer, which combine high lateral mobility with significant compressibility (e.g., an effective elastic modulus Elipid~20 MPa, 31 leads to a contact stiffness roughly 2000-fold less than glass (Eglass~50 GPa)). The inventors have repeated these experiments using nominally identical tips, tip holders, and lipid sample preparations. In contrast to glass surface results which are generally consistent, the lipid experiments have yielded rich and varied behavior. In some experiments Fx goes positive upon interacting with lipid, while Fy goes negative (see Appendix, Section 12 and FIG. 14A); in others Fx is largely unchanged and Fy goes positive upon interacting with the lipid (see Appendix, Section 12 and FIG. 14B). Curiously, this diversity of tip-sample interaction behavior was observed on a relatively simple single-component lipid bilayer using nominally identical preparations (all at ~25° C.).

The three dimensional trajectory of commercial AFM tips were studied as they interacted with glass and lipid surfaces in a tapping mode of operation, in aqueous solution. Upon measuring the 3D spring constants and effective masses, the interaction force components were determined as a tip came into intermittent contact with the surface. Owing to the 3D nature of the local observable, this technique yielded the 3D force rapidly (10 ms, after calibration and reference acceleration determination) without the need for lateral scanning.

Direct measurement of the orthogonal force components in three dimensions provided insight into the tip-sample interaction. Though tapping mode clearly minimizes lateral forces applied to the sample compared to contact mode, the measurements indicate that these forces are still substantial—reaching about 50% of the normal force—and lead to a tilt angle of the force vector significantly larger than the static geometry of the apparatus. While these measurements were taken using transparent surfaces 134 as the tip position detection laser (810 nm or 845 nm) passes through the substrate 134; it should be understood that shifting this wavelength further into the infrared would enable generalizing the technique to the use of common semiconducting substrates, e.g., silicon, as surface 134. Furthermore, the technique described herein is compatible with high speed AFM; indeed, as cantilevers become increasingly small there is growing demand for high numerical aperture optics to replace traditional optical lever arm detection schemes. Direct measurement of 3D interaction forces can enhance the understanding of common AFM operations and provide a foundation for a robust 3D force probe in perturbative conditions relevant to numerous biological and chemical investigations. For example, the techniques described herein can be applied in biophysics to directly map trajectories of disordered protein structures and flexible loops, which are critical facilitators of protein-protein interactions.

As previously noted, with traditional AFM, only the vertical component of force for the tip is computed, and this computation is based on indirect means (i.e., observation of cantilever deflection). However, example embodiments described herein are capable of directly and rapidly measuring the 3D force. The capability to determine both the direction and magnitude of the force acting on the tip of an AFM has numerous applications. From a fundamental standpoint, the tip as well as the sample are both three dimensional objects that experience interaction forces in 3D. Thus, the example embodiments described herein provide a more accurate measurement of the "true" force of interaction. The ability to directly and rapidly make maps of this force field is of fundamental and practical importance to surface science. For example, it would be possible to directly measure the force required to push an atom or molecule across or a surface. Such knowledge could then, for example, inform the development of a new generation of low friction materials. In addition to studying static surfaces with great detail, the example embodiments described herein allow for unprecedented measurements of time dynamic samples. For example, proteins, membrane proteins, nucleic acids, catalyst particles, and other solid-state devices all move in response to their environment or inputs. Being able to measure the conformational trajectories between states of such systems represents new knowledge that is not accessible via conventional methods.

While the present invention has been described above in relation to exemplary embodiments, various modifications may be made thereto that still fall within the invention's scope, as would be recognized by those of ordinary skill in the art. Such modifications to the invention will be recognizable upon review of the teachings herein. As such, the full scope of the present invention is to be defined solely by the appended claims and their legal equivalents.

APPENDIX

Supporting information about the sample preparation and tip selection, tip position calibration and data acquisition as well as 3D spring constant determination with respect to example embodiments described above are presented below. Further, this appendix shows: tapping mode tip position calibrations in y and z, contact and tapping mode calibration comparison, full cycle force spectrum, asymmetric behavior of ΔZ during intermittent contact, lateral slipping during contact mode approach, signal-to-noise determination for Xtip, resonance frequency dependence on medium, detailed view of tapping tip dynamics on glass, and the diversity of 3D force components on lipid bilayers.

Appendix Section 1

Sample Preparation and Tip Selection

Glass coverslips (Corning) were cleaned using a KOH/ethanol bath as is standard in single molecule assays. After cleaning, 50 nm tall, 700 nm diameter amorphous silicon fiducial marks were deposited at 10 micron intervals (square grid) over 1 mm² via physical vapor deposition through a silicon nitride membrane window (DuraSiN Mesh, Protochips, Inc.) acting as a shadow mask.

Two types of tips were utilized in this work directly as supplied from the manufacturer (Bruker). MSNL-E: nominal spring constant knom=0.1 N/m, fundamental resonance frequency in fluid fo~6-18 kHz, length l=140 μm; and MSNL-F: knom=0.6 N/m, fo~25-40 kHz, l=85 μm.

For lipid bilayer experiments, liposomes were prepared by extrusion of 1-palmitoyl-2-oleoyl-snglycero-3-phosphocholine (POPC) lipids (Avanti) suspended in 50 mM NaH2PO4 pH 7.2, 50 mM NaCl, 10 mM Ethylenediaminetetraacetic acid (EDTA) through a membrane with a 100 nm pore diameter. Supported planar bilayers were formed by vesicle fusion to clean glass surfaces. Prior to performing 3D force measurements, bilayers were imaged in buffer (75 mM NaH2PO4 pH8.0), in tapping mode, using an MSNL-E tip.

Appendix Section 2

Tip Position Calibration and Data Acquisition

Orthogonal and linear detection of tip position along the coordinate axes was achieved in a manner similar to previous reports. (See Churnside, A. B. et al., Proceedings of SPIE 2009, 7405, 7405OH; see also King, G. M. et al., Nano Letters 2009, 9, (4), 1451). The averaged (4 ms window) back scattered signals (in Volts) for each axis x, y, and z were scaled into positions via $$x_{tip}(V_x, V_y, V_z) = \sum_{i,j,k=0}^{i+j+k=5} a_{ijk} V_x^i V_y^j V_z^k$$

where the coefficients $a_{ijk}$ were determined by a fifth order non-linear least square fitting routine. The 100×100×100 nm³ calibration volume was centered 50 nm above the glass surface. The scan rate of the tip during calibration was 350 nm/s, which is rapid compared to the instrumental drift rate (typically ~0.02 nm/s), but slow compared to the onset of significant hydrodynamic drag effects (~1000 nm/s, for a probe of similar dimensions). Cantilever deflection sensing was achieved with a separate laser ($\lambda_1$=785 nm) and detector. The data from this QPD (in Volts) were scaled using standard calibration procedures. (See to Reit, J. et al., Ultramicroscopy 2011, 111,1659).

Appendix Section 3

3D Spring Constant Determination

A modified calibration routine was used to acquire the high bandwidth data necessary for power spectral density analysis. First, voltage data were acquired by scanning the tip on each axis sequentially through the 810 or 845 nm detector beam. Then, a first order fit was performed. The reciprocal of the slope of this line was taken as sensitivity (nm/V) and was used to convert the subsequent high bandwidth voltage readings to position data. Air was used as a medium for these measurements because this minimized damping and hence aided peak assignment. It should be noted that spring constants should not depend on the medium; this was confirmed for determinations of kz on the same tip evaluated in both air and in fluid, which agreed to within 12%. It should also be noted that kz, as deduced from fits to the positional Ztip PSD, agreed with fits to the PSD of the traditional ΔZ observable to within 50%. Analogous comparisons of fo, the resonance frequency of the fundamental mode, agreed to within <0.5%. Measured and predicted shifts of the resonant frequencies in fluid are discussed in Appendix Section 10 and FIG. 12.

Appendix Section 4

FIG. 6: Tapping Mode Tip Position Calibrations in y and z

Figure 6A:
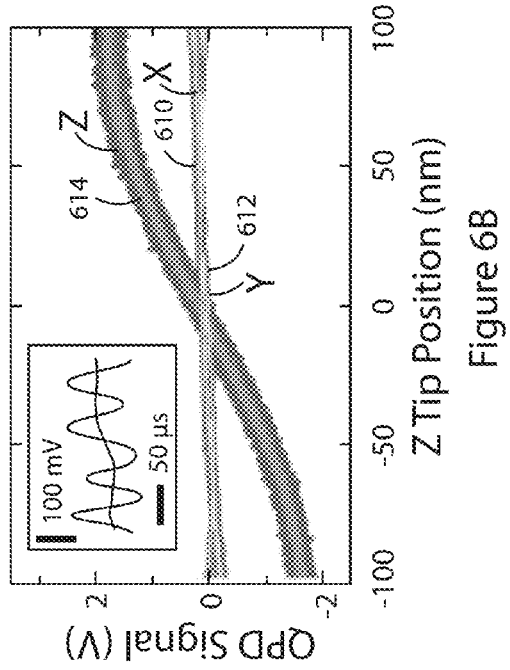
FIGS. 6-14 depict various plots of supporting information described in the Appendix.
Figure 6B:
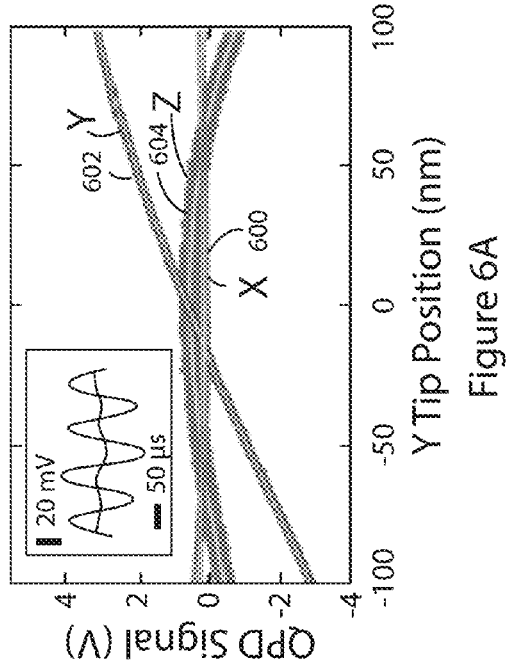

Cross section of a calibration volume shows the position detection QPD output in FIG. 6 as a function of tip position along (A) y-axis (keeping x and z stationary) and (B) z-axis (keeping x and y stationary). The piezo electric stage (P363.3CD, Physik Instrumente) was used to move the tapping tip through the fixed position detection laser $\lambda_2$=845 nm) along the major axis keeping the other two axes stationary. Dark colored curves show full bandwidth data (Vx: plot 600 in FIG. 6A and plot 610 in FIG. 6B, Vy: plot 602 in FIG. 6A and plot 612 in FIG. 6B, Vz: plot 604 in FIG. 6A and plot 614 in FIG. 6B). The light colored lines are smoothed (flp=250 Hz). Insets: detailed time domain views reveal several cycles of the tapping mode oscillations on each axis.

Appendix Section 5

Figure 7:
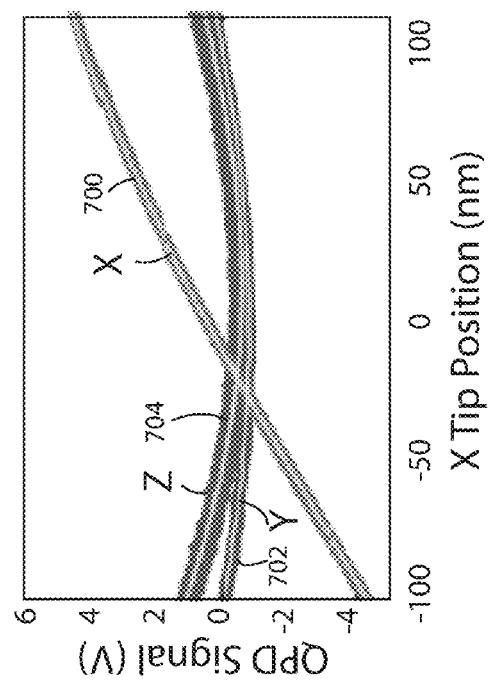

FIG. 7: Contact and Tapping Mode Calibration Comparison

FIG. 7 shows the voltage outputs Vx 700, Vy 702, Vz 704 from the tip position detection QPD (thick lines) as a function of contact mode tip position. In particular, the piezo electric stage was used to move the tip through the fixed position detection laser ($\lambda_2$=845 nm) in x, keeping y and z stationary (Vx 700, Vy 702, Vz 704). For comparison, averaged tapping mode data are overlaid in light colors on each axis showing that the two sets of curves are essentially identical. Thus, robust and proven calibration routines are applicable to tapping mode operation.

Appendix Section 6

Figure 8:
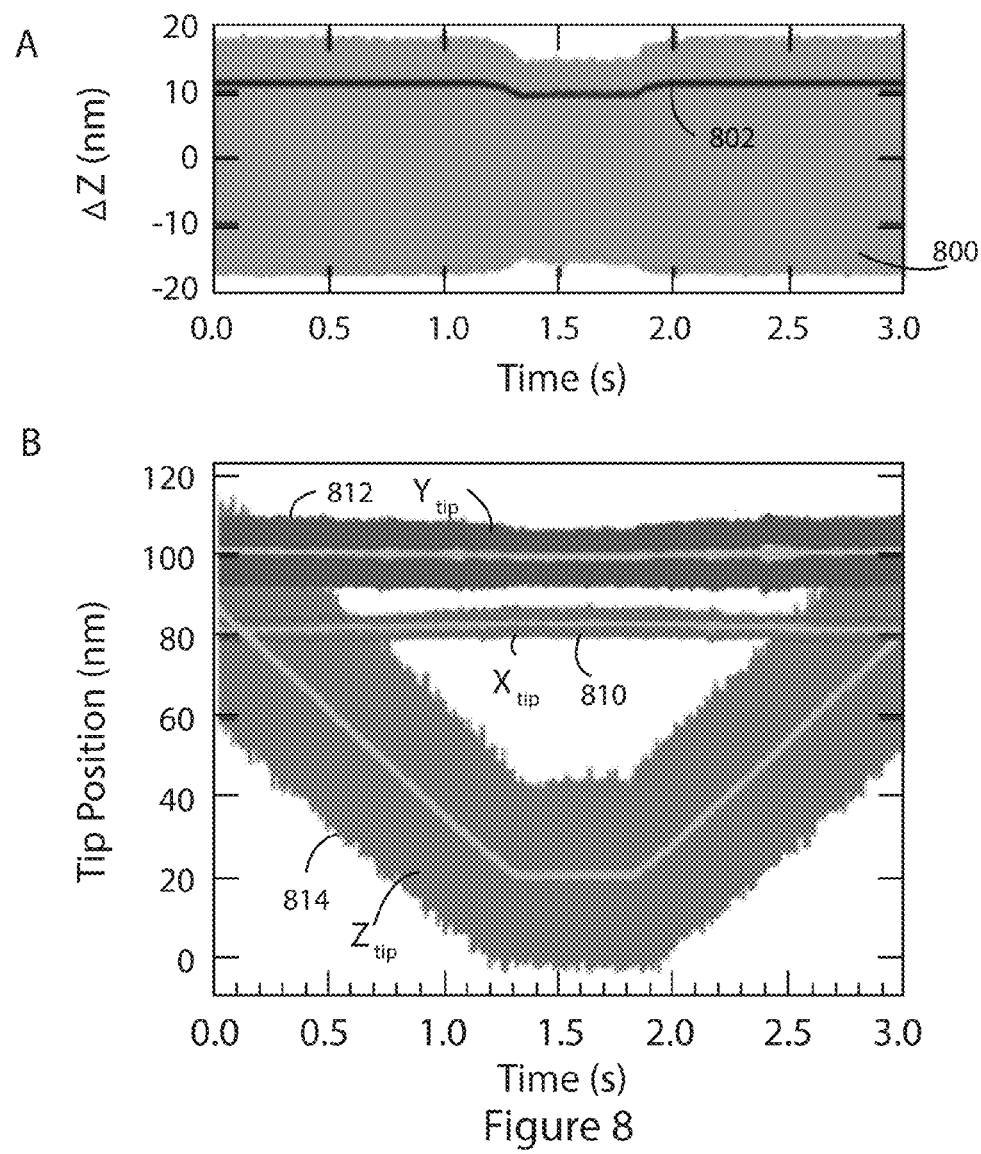

FIG. 8: Full Cycle Force Spectrum

FIG. 8 shows a continuous full cycle force curve which includes tip advance (rate=50 nm/s), a 500 ms pause in intermittent contact with the surface, followed by tip retract (rate=50 nm/s). The traditional observables ΔZ and its root mean square (rms) amplitude as shown (A, plots 800 and 802, respectively) as well as the simultaneous (in the limit of the acquisition cards) tip trajectory (B, Xtip 810, Ytip 812, Ztip 814). Data are displayed at full bandwidth (690 k samples/s for 3D tip position, 150 k samples/s on ΔZ) in the time domain, as they are acquired by the instrument. The light gray curves indicate averages (smoothed to 1 kHz) of the tip position signals.

Appendix Section 7

Figure 9:
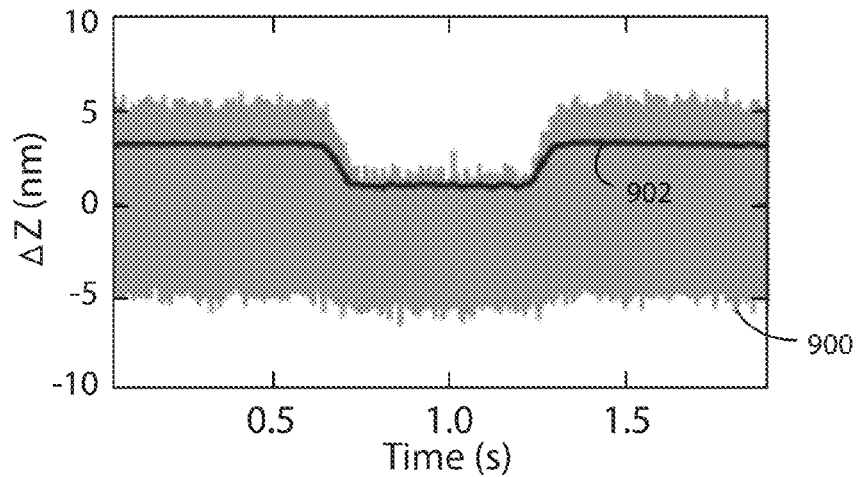

FIG. 9: Asymmetric Behavior of ΔZ

FIG. 9 shows the traditional observable ΔZ and its root mean square (rms) amplitude (plots 900 and 902, respectively) during a continuous full cycle force curve acquisition which includes tip advance (rate=50 nm/s), a 500 ms pause in intermittent contact with the surface, followed by tip retract (rate=50 nm/s). Data are displayed at full bandwidth (150 k samples/s) in the time domain. As is common in tapping mode fluid conditions, asymmetric behavior of the ΔZ signal was observed when the tapping tip came into intermittent contact with the glass surface. The magnitude of the asymmetry varied with tip selection (k=0.1 N/m in this case) and with choice of tapping mode drive frequency and amplitude.

Appendix Section 8

Figure 10:
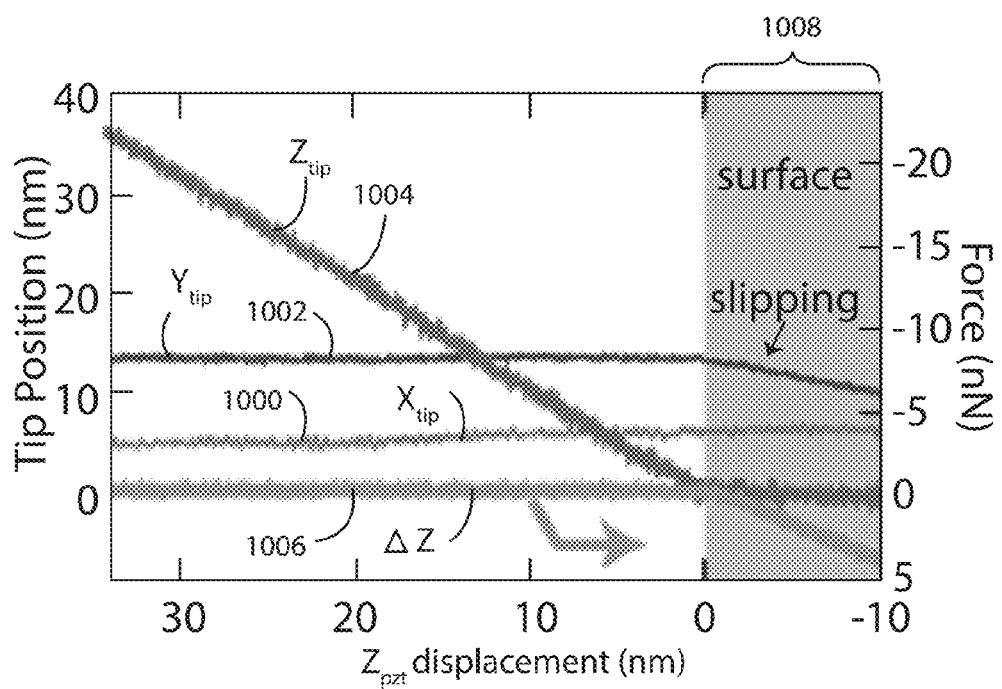

FIG. 10: Lateral Slipping During Contact Mode Approach

FIG. 10 shows the 3D tip trajectory in the X, Y, and Z dimensions (see plots 1000, 1002, and 1004, respectively) during contact mode approach along with the traditional observable ΔZ 1006. Data were acquired in aqueous buffer solution with an MSNL-F tip; a clean glass surface 134 was used. When the tip contacted the surface (grey region 1008), we measured significant sliding (~1.4 nm displacement per nN load) along the surface in Y, that is, in the direction of the long axis of the cantilever 132. Such tip sliding has been discussed (see Stiernedt, J. et al., Rev. Sci. Instrum. 2005, 76, 083710; see also Pratt, J. R. et al., J. Appl. Phys. 2010, 107, 044305), but to the inventors' knowledge it had previously not been directly observable with traditional apparatus. With this example, in tapping mode, the inventors did not observe significant slippage of the Ytip position when contacting the surface intermittently, confirming a main justification for adopting this mode—minimization of difficult-to-control lateral forces.

Appendix Section 9

Figure 11:
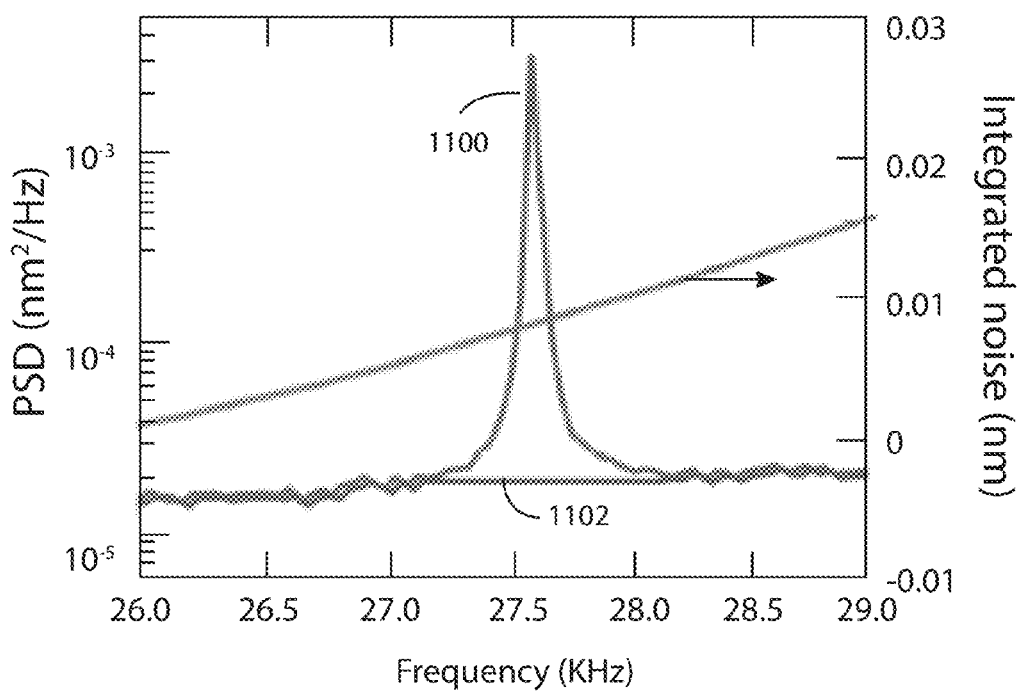

FIG. 11: Signal-to-Noise Determination for Xtip

The inventors estimated the noise floor for the observable Xtip(t) during tapping mode operation shown in FIG. 3C. The power spectral density of the raw (unfiltered) data in a 3 kHz band around the resonance peak (1100) was first plotted. Signal power residing between 27 kHz and 28 kHz was then removed from the PSD and replaced with an interpolation (1102). To quantify the noise power residing in the vicinity of this peak, we integrated the interpolated PSD over 3 kHz to yield an integrated noise level of 15 μm. Thus, we estimated the signal-to-noise ratio of our measurement of Xtip(t) as 0.28/0.015=19 (in a 3 kHz band about 27 kHz).

Appendix Section 10

FIG. 12: Resonance Frequency Dependence on Medium

FIG. 12 shows power spectral density of a thermally driven cantilever in air and in aqueous solution showing the shifting frequency Δf of the fundamental normal deflection mode (A) with the tip well above the surface (see plots 1200 (air) and 1202 (aqueous solution). (B) Analogous plots of the shifting frequency of the fundamental torsional mode are shown for air (1210) and aqueous solution (1212). In both cases, the frequency shifted downwards by a factor of ~3 in liquid as compared to measurements in air. These measured shifts are in overall agreement with previous experiments as well as with theory $$\frac{f_{fluid}}{f_{vac}} = \left[1 + \left(\frac{\rho \pi b}{4 \rho_c h}\right)\right]^{-\frac{1}{2}} = 0.31,$$

where ffluid and fvac are the resonant frequencies in fluid and vacuum respectively, $\rho_c$ is the density of the cantilever beam, b and h are the width and thickness of the beam, and $\rho$ is the density of the fluid. Thus, a 3-fold shift was applied to measured resonance frequencies in air when required for calculations in fluid.

Appendix Section 11

Figure 13:
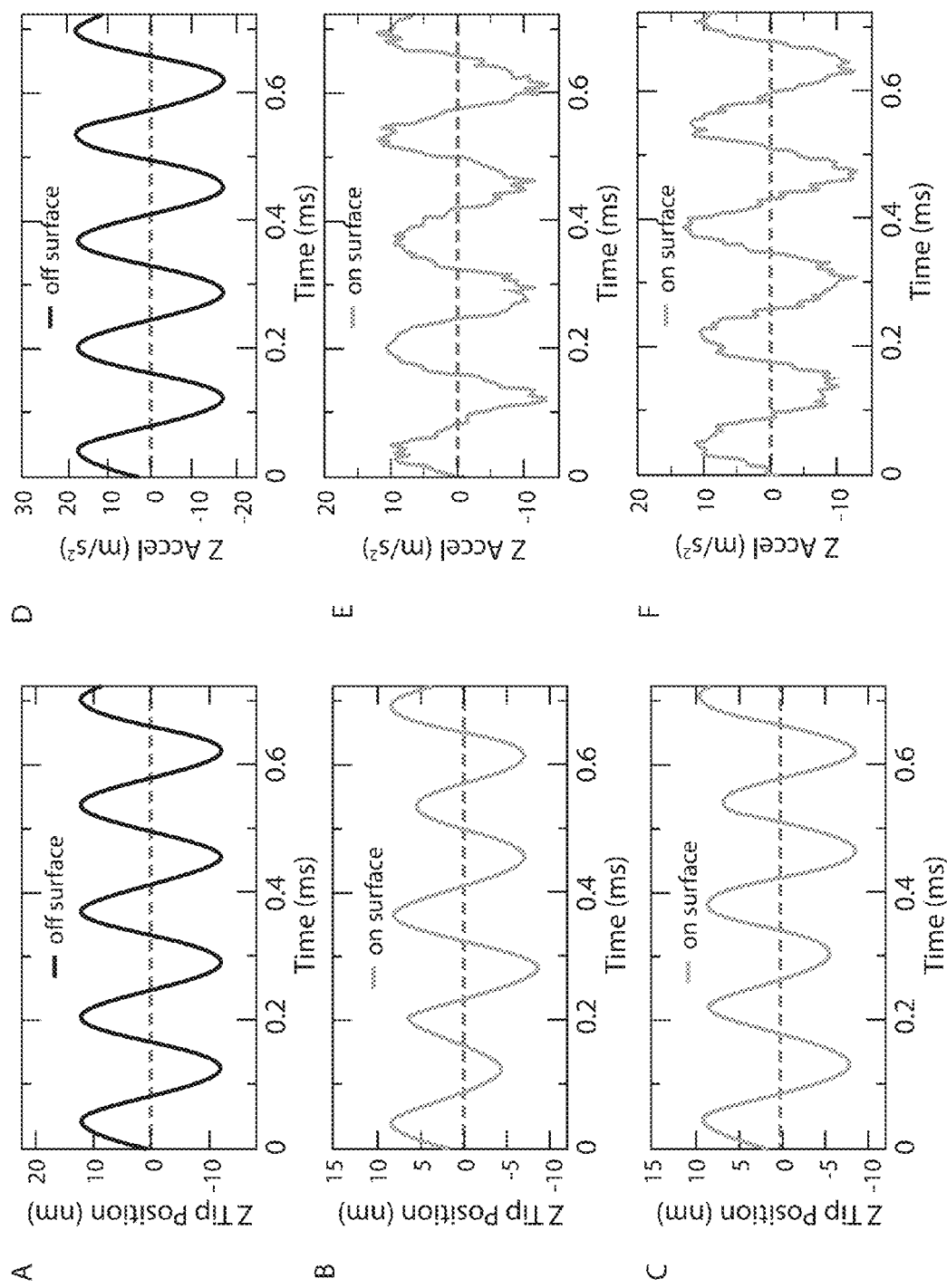

FIG. 13: Detailed View of Tapping Tip Dynamics on Glass

FIG. 13 shows (A) Measured Z tip position versus time when the tip was positioned above the surface. (B) and (C) Z-tip trajectory during intermittent contact with the surface at two different instances. The data shown in (A) were filtered (band-pass, 1 kHz window about the drive frequency, 5th order). This filtering was relaxed in (B) and (C) to a +/−5.5 kHz window. (D)-(F) show accelerations $\ddot{Z}_{tip}$ corresponding to the three position plots shown in (A-C).

Appendix Section 12

Figure 14:
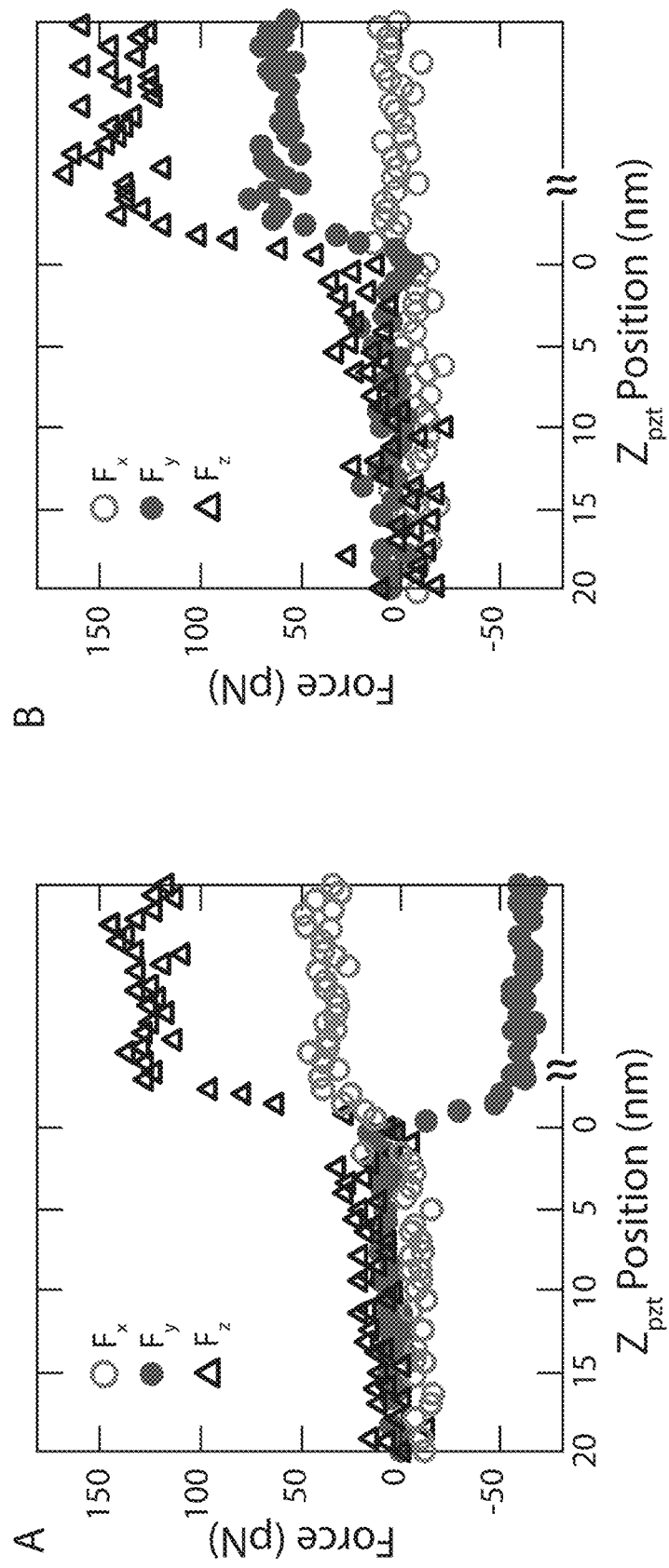

FIG. 14: Diversity of 3D Interaction Forces on Lipid Bilayers

FIG. 14 shows 3D force spectroscopy commenced after identifying supported lipid bilayers on glass surfaces via imaging as described above. (A & B) Components of the three-dimensional force as a function of the height of the tip's base, Zpzt, are plotted for two nominally identical preparations of POPC. The horizontal axes are discontinuous, indicating where the tip advance was halted.

What is claimed is:

1. An apparatus comprising:
   a scanning probe microscope, the scanning probe microscope having a moveable tip, and wherein the scanning probe microscope is configured to move the tip in a tapping mode to cause tapping movement for the tip;
   a position detector, the position detector configured to (1) directly detect the tapping tip, and (2) generate an output signal indicative of a plurality of positions for the detected tip over time; and
   a processor configured for operation in conjunction with the position detector, the processor configured to (1) process data representative of the output signal from the position detector, (2) determine a plurality of positions for the tapping tip over time in at least one dimension based on the processed data, (3) process the determined tip positions, and (4) compute a force for the tapping tip in at least one dimension based on the processed tip positions over time.

2. The apparatus of claim 1 wherein the scanning probe microscope is configured for observation of an object by the tapping tip, and wherein the computed force comprises a force representative of an interaction force between the tapping tip and the object under observation.

3. The apparatus of claim 2 wherein the processor is further configured to (1) compute a first acceleration for the tapping tip based on a plurality of the detected tip positions over time while the tapping tip is not in contact with the object, (2) compute a second acceleration for the tapping tip based on a plurality of the detected tip positions over time while the tapping tip is in contact with the object, and (3) isolate the interaction force between the tapping tip and the object under observation based on a difference between the computed first acceleration and the computed second acceleration.

4. The apparatus of claim 1 wherein the position detector comprises:
a light source positioned and configured to direct light onto the tip as the tip moves in the tapping mode; and
a light-sensitive position sensor positioned and configured to receive and sense back-scattered light from the tapping tip in response to the directed light.

5. The apparatus of claim 4 wherein the scanning probe microscope comprises an atomic force microscope (AFM), and wherein the light source comprises a laser source.

6. The apparatus of claim 5 further comprising:
a surface onto which the tip comes into intermittent contact as a result of the tapping mode;
an optical isolator positioned and configured to provide optical communication among the laser source, the tapping tip, and the light-sensitive position sensor; and
a lens positioned optically between the optical isolator and the tapping tip, the lens configured to direct laser light onto the tapping tip and collect the back-scattered light from the tapping tip.

7. The apparatus of claim 6 wherein the optical isolator is configured to separate laser light from the laser source that is propagating toward the tapping tip from the back-scattered light propagating away from the tapping tip, the optical isolator including a polarized beam splitter.

8. The apparatus of claim 6 wherein the surface is configured to pass light, and wherein the surface is positioned optically between the tapping tip and the optical isolator.

9. The apparatus of claim 1 wherein the scanning probe microscope further comprises:
a cantilever arm to which the moveable tip is attached; and
a member of the group consisting of (1) a piezoelectric transducer configured to drive the cantilever arm, and (2) a photothermal driver, the member configured to cause the tapping movement for the tip.

10. The apparatus of claim 1 wherein the processor is further configured to (1) determine the tip positions over time in a plurality of dimensions, and (2) compute the force as a force vector for the moving tip in the plurality of dimensions based on the processed tip positions over time.

11. The apparatus of claim 10 wherein the plurality of dimensions are three dimensions (3D).

12. A method comprising:
directly detecting a tip of a scanning probe microscope as the tip moves in a tapping mode;
based on the direct observations, determining a plurality of positions for the tapping tip over time in at least one dimension;
processing the determined tip positions over time; and
computing a force for the tapping tip in at least one dimension based on the processed tip positions over time.

13. The method of claim 12 further comprising:
observing an object via the tapping tip; and
wherein the computing step comprises computing a force representative of an interaction force between the tapping tip and the object under observation based on the processed tip positions over time.

14. The method of claim 13 wherein the processing step comprises (1) computing a first acceleration for the tapping tip based on a plurality of the detected tip positions over time while the tapping tip is not in contact with the object, and (2) computing a second acceleration for the tapping tip based on a plurality of the detected tip positions over time while the tapping tip is in contact with the object; and
wherein the force computing step comprises isolating the interaction force between the tapping tip and the object under observation based on a difference between the computed first acceleration and the computed second acceleration.

15. The method of claim 12 wherein the directly observing step comprises:
directing light onto the tapping tip; and
sensing back-scattered light from the tapping tip in response to the directed light; and
wherein the determining step comprises determining the positions for the tapping tip over time in at least one dimension based on the sensed back-scattered light.

16. The method of claim 15 wherein the scanning probe microscope is an atomic force microscope (AFM), and wherein the light is a laser from a laser source.

17. The method of claim 16 wherein the directing step further comprises:
directing the laser from the laser source onto the tapping tip via a surface that passes light, the surface being positioned optically between the laser source and the tapping tip.

18. The method of claim 17 further comprising:
performing the method steps while an object is located on the surface.

19. The method of claim 18 wherein the object comprises a lipid bilayer material, the method further comprising:
the tapping tip intermittently contacting the lipid bilayer material.

20. The method of claim 15 further comprising:
optically isolating the back-scattered light from the directed light via an optical isolator that includes a polarizing beam splitter.

21. The method of claim 15 wherein the sensing step comprises sensing the back-scattered light via a light-sensitive position sensor;
wherein the determining step comprises:
generating a first voltage signal based on the sensed back-scattered light, wherein the first voltage signal is proportional to a normalized lateral difference in optical power on a first portion of the sensor;
generating a second voltage signal based on the sensed back-scattered light, wherein the second voltage signal is proportional to a normalized lateral difference in optical power on a second portion of the sensor;
generating a third voltage signal based on the sensed back-scattered light, wherein the third voltage signal is proportional to a total power incident on the sensor as a whole;

computing a plurality of positions for the tapping tip over time with respect to a first dimension based on the generated first, second, and third voltage signals;

computing a plurality of positions for the tapping tip over time with respect to a second dimension based on the generated first, second, and third voltage signals; and computing a plurality of positions for the tapping tip over time with respect to a third dimension based on the generated first, second, and third voltage signals;

wherein the processing step comprises:
computing a second time derivative for computed positions over time with respect to the first dimension;
computing a second time derivative for computed positions over time with respect to the second dimension;
computing a second time derivative for computed positions over time with respect to the third dimension; and wherein the force computing step comprises:
computing a force vector for the tapping tip with respect to the first dimension based on Newton's second law applied to the computed second time derivative for the computed positions over time with respect to the first dimension;
computing a force vector for the tapping tip with respect to the second dimension based on Newton's second law applied to the computed second time derivative for the computed positions over time with respect to the second dimension; and
computing a force vector for the tapping tip with respect to the third dimension based on Newton's second law applied to the computed second time derivative for the computed positions over time with respect to the third dimension.

22. The method of claim 12 wherein the determining step comprises determining the tip positions over time in a plurality of dimensions, and wherein the computing step comprises computing the force as a force vector for the tapping tip in the plurality of dimensions based on the processed tip positions over time.

23. The apparatus of claim 22 wherein the plurality of dimensions are three dimensions (3D).

24. The method of claim 12 wherein the tip is attached to a cantilever arm of the scanning probe microscope, the method further comprising:
experimentally determining a spring constant value for the cantilever arm; and
wherein the computing step comprises computing the force based on the processed tip positions over time and the experimentally determined spring constant.

25. The method of claim 12 further comprising performing the method steps without a lateral scanning of the light source onto the tip.

26. The method of claim 12 further comprising:
monitoring an object via the tapping tip; and
based on the computed force, measuring a conformational dynamic for the monitored object.

27. The method of claim 26 wherein the object is a molecule.

28. The method of claim 27 wherein the molecule is a biological protein.

29. The method of claim 27 wherein the molecule is a membrane protein.

30. The method of claim 26 wherein the conformational dynamic is a shape change for the object.

31. The method of claim 26 wherein the conformational dynamic comprises a conformational trajectory of a molecular species.

32. The method of claim 26 wherein the object is a catalyst particle.

33. The method of claim 32 further comprising performing the method steps as the catalyst particle undergoes a catalytic turn over.

34. The method of claim 12 further comprising:
monitoring an object via the tapping tip; and
based on the computed force, generating a force image for the monitored object.

35. The method of claim 12 further comprising:
monitoring a lipid or protein molecule in its natural, soft state via the tapping tip.

36. The method of claim 12 further comprising:
monitoring an object via the tapping tip; and
based on the computed force, measuring atomic scale or molecular scale friction for the object with respect to the tapping tip.

37. A method comprising:
directing light onto a tip of a scanning probe microscope as the tip moves in a tapping mode;
sensing back-scattered light from the tapping tip in response to the directed light source;
based on the sensed back-scattered light, determining a plurality of positions for the moving tip over time in at least one dimension;
processing the determined tip positions over time; and
computing a force for the tapping tip in at least one dimension based on the processed tip positions over time.

* * * * *